US012083487B2

(12) United States Patent
Jang et al.

(10) Patent No.: US 12,083,487 B2
(45) **Date of Patent: *Sep. 10, 2024**

(54) HAIR DYE DISPENSER AND SYSTEM COMPRISING THEREOF

(71) Applicant: LG FAROUK CO., Seoul (KR)

(72) Inventors: Kyung Sik Jang, Seoul (KR); Jeong Ho Lee, Seoul (KR); Jung Yong Lee, Seoul (KR); Seong Lok Hwang, Seoul (KR); Sang Min Lee, Seoul (KR); Joong Hun Kim, Seoul (KR)

(73) Assignee: LG FAROUK CO., Seoul (KR)

( * ) Notice: Subject to any disclaimer, the term of this patent is extended or adjusted under 35 U.S.C. 154(b) by 249 days.

This patent is subject to a terminal disclaimer.

(21) Appl. No.: 17/521,424

(22) Filed: Nov. 8, 2021

(65) Prior Publication Data

US 2022/0061487 A1 Mar. 3, 2022

Related U.S. Application Data

(62) Division of application No. 17/266,932, filed as application No. PCT/KR2019/014066 on Oct. 24, 2019.

(30) Foreign Application Priority Data

Nov. 20, 2018 (KR) ........................ 10-2018-0143539
Nov. 20, 2018 (KR) ........................ 10-2018-0143542

(51) Int. Cl.
*B01F 33/84* (2022.01)
*A45D 34/04* (2006.01)
(Continued)

(52) U.S. Cl.
CPC .......... *B01F 33/8442* (2022.01); *A45D 34/04* (2013.01); *A45D 44/005* (2013.01);
(Continued)

(58) Field of Classification Search
CPC .. B01F 33/8442; B01F 33/841; B01F 35/881; A45D 2044/007
See application file for complete search history.

(56) References Cited

U.S. PATENT DOCUMENTS 4,815,042 A 3/1989 Pratt
4,844,297 A 7/1989 Smith
(Continued)

FOREIGN PATENT DOCUMENTS

CN 2693065 Y 4/2005
CN 101076312 A 11/2007
(Continued)

*Primary Examiner* — Jeremy Carroll
(74) *Attorney, Agent, or Firm* — Birch, Stewart, Kolasch & Birch, LLP

(57) ABSTRACT

A hair dye dispenser according to an embodiment of the present invention includes a housing having an opening hole formed on one side of which a hair dye is provided, a plurality of cartridges disposed inside the housing and accommodating at least one dyeing material, a main body in which the plurality of cartridges are rotatably disposed, a main motor for rotating the main body so that a first cartridge of the plurality of cartridges is located adjacent to the opening hole, a discharge module for discharging the dyeing material contained in the first cartridge, and an accommodating body in which a basket accommodating the dyeing material discharged by the discharge module is placed, wherein the discharge module may include an elevating body that pressurizes the first cartridge when moving up and is separated from the first cartridge when moving down.

20 Claims, 19 Drawing Sheets

(51) Int. Cl.

| | |
|---|---|
| ***A45D 44/00*** | (2006.01) |
| ***B01F 33/841*** | (2022.01) |
| ***B01F 35/22*** | (2022.01) |
| ***B01F 35/88*** | (2022.01) |

(52) U.S. Cl.

CPC ........ *B01F 33/841* (2022.01); *B01F 35/2202* (2022.01); *B01F 35/881* (2022.01); *A45D 2044/007* (2013.01)

(56) References Cited

U.S. PATENT DOCUMENTS

| | | | | |
|---|---|---|---|---|
| 6,089,408 | A | 7/2000 | Fox | |
| 6,202,895 | B1 | 3/2001 | Fox | |
| 6,202,899 | B1 | 3/2001 | Lasserre et al. | |
| 6,460,546 | B1 | 10/2002 | Sofer | |
| 6,513,534 | B1 | 2/2003 | Sofer et al. | |
| 6,655,551 | B2 | 12/2003 | Manne | |
| 7,597,217 | B2 | 10/2009 | Mink et al. | |
| 9,205,283 | B2 | 12/2015 | Miklatzky et al. | |
| 9,579,674 | B2 | 2/2017 | Hatton et al. | |
| 9,671,795 | B2 | 8/2017 | Igarashi | |
| 10,012,588 | B2 | 7/2018 | Miklatzky et al. | |
| 11,433,363 | B2 | 9/2022 | Gros et al. | |
| 11,712,714 | B1 * | 8/2023 | Bilge | B05D 1/265<br>427/282 |
| 2002/0031485 | A1 | 3/2002 | Colombo | |
| 2004/0159676 | A1 * | 8/2004 | Adema | B01F 35/8822<br>222/144 |
| 2005/0087545 | A1 * | 4/2005 | Petrus Engels | B01F 35/2117<br>222/77 |
| 2005/0194403 | A1 | 9/2005 | Mink et al. | |
| 2005/0269367 | A1 * | 12/2005 | Post | B01F 35/2207<br>222/185.1 |
| 2012/0175385 | A1 * | 7/2012 | Voskuil | F16K 31/52433<br>222/144.5 |
| 2014/0271231 | A1 | 9/2014 | Post | |
| 2014/0352843 | A1 | 12/2014 | Solera et al. | |
| 2016/0047371 | A1 | 2/2016 | Post | |
| 2017/0326515 | A1 * | 11/2017 | Drocco | B01F 35/56 |
| 2018/0008946 | A1 | 1/2018 | Macedo et al. | |
| 2018/0125206 | A1 | 5/2018 | Shami | |
| 2018/0125207 | A1 | 5/2018 | Shami | |
| 2020/0256067 | A1 * | 8/2020 | King | B24B 7/182 |

FOREIGN PATENT DOCUMENTS

| | | | |
|---|---|---|---|
| CN | 102695659 | A | 9/2012 |
| CN | 103968932 | A | 8/2014 |
| CN | 104135890 | A | 11/2014 |
| CN | 105813626 | A | 7/2016 |
| CN | 107084779 | A | 8/2017 |
| CN | 107289731 | A | 10/2017 |
| CN | 107361508 | A | 11/2017 |
| EP | 0 481 371 | A1 | 12/1991 |
| GB | 1 403 624 | A | 8/1975 |
| JP | 2002-58535 | A | 2/2002 |
| KR | 2002-0008370 | A | 1/2002 |
| KR | 2002-0063493 | A | 8/2002 |
| KR | 2003-0070015 | A | 8/2003 |
| KR | 10-1152457 | B1 | 6/2012 |
| KR | 10-2014-0027952 | A | 3/2014 |
| KR | 10-2014-0034153 | A | 3/2014 |
| KR | 10-2015-0071476 | A | 6/2015 |
| KR | 10-2016-0147828 | A | 12/2016 |
| KR | 10-2017-0103007 | A | 9/2017 |
| KR | 10-2018-0007500 | A | 1/2018 |
| KR | 10-1857976 | B1 | 5/2018 |
| WO | WO 99/48802 | A1 | 9/1999 |
| WO | WO 02/05968 | A2 | 1/2002 |
| WO | WO 2012/104723 | A1 | 8/2012 |
| WO | WO 2018/042137 | A1 | 3/2018 |
| WO | WO 2018/198149 | A1 | 11/2018 |

* cited by examiner

[Fig. 1]
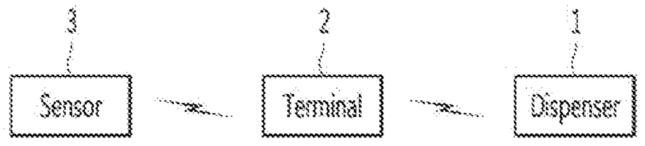
[Fig. 2]
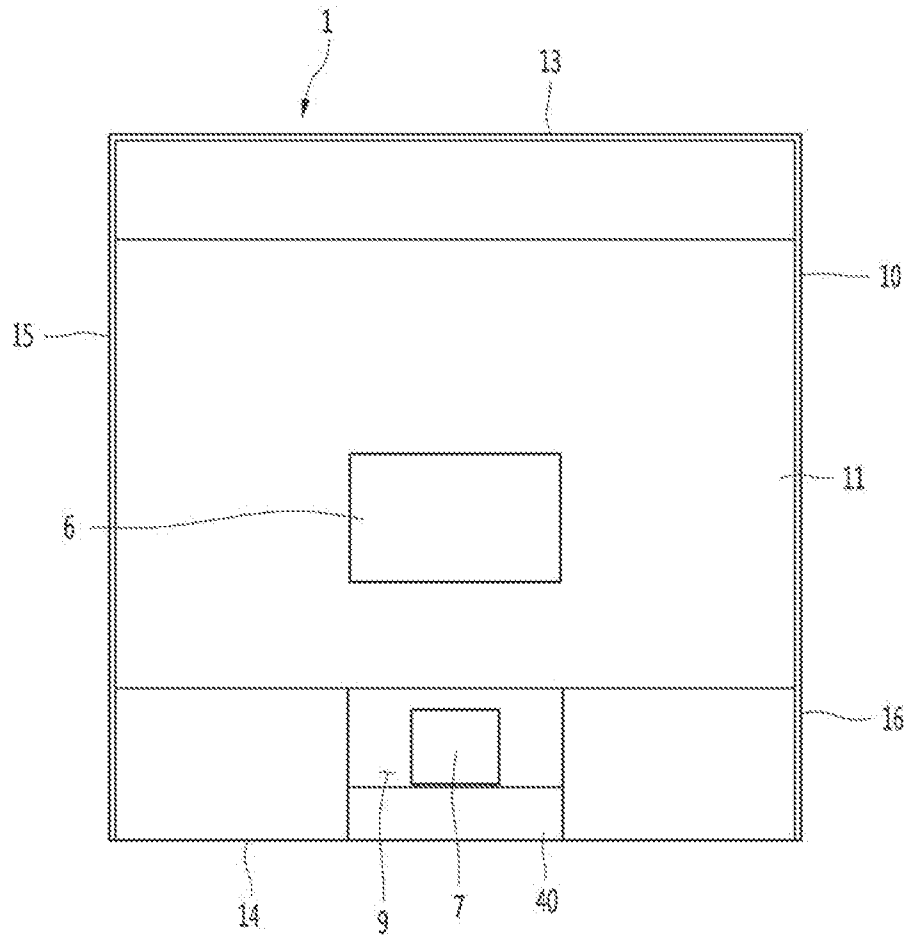

[Fig. 3]
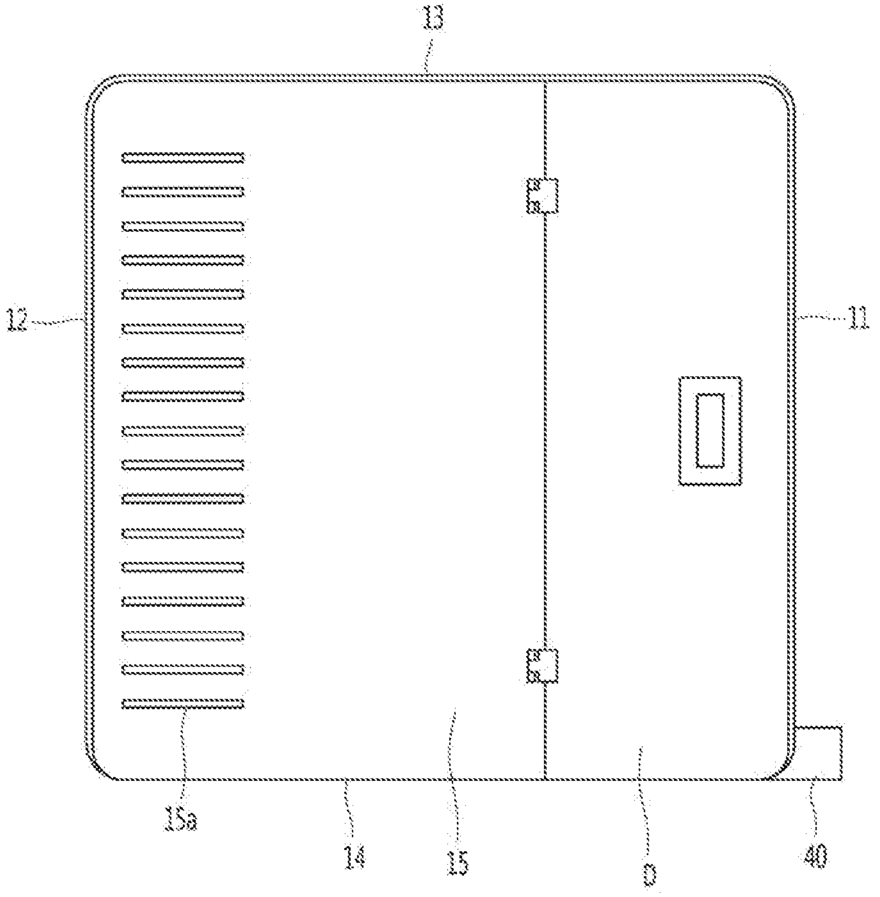

[Fig. 4]
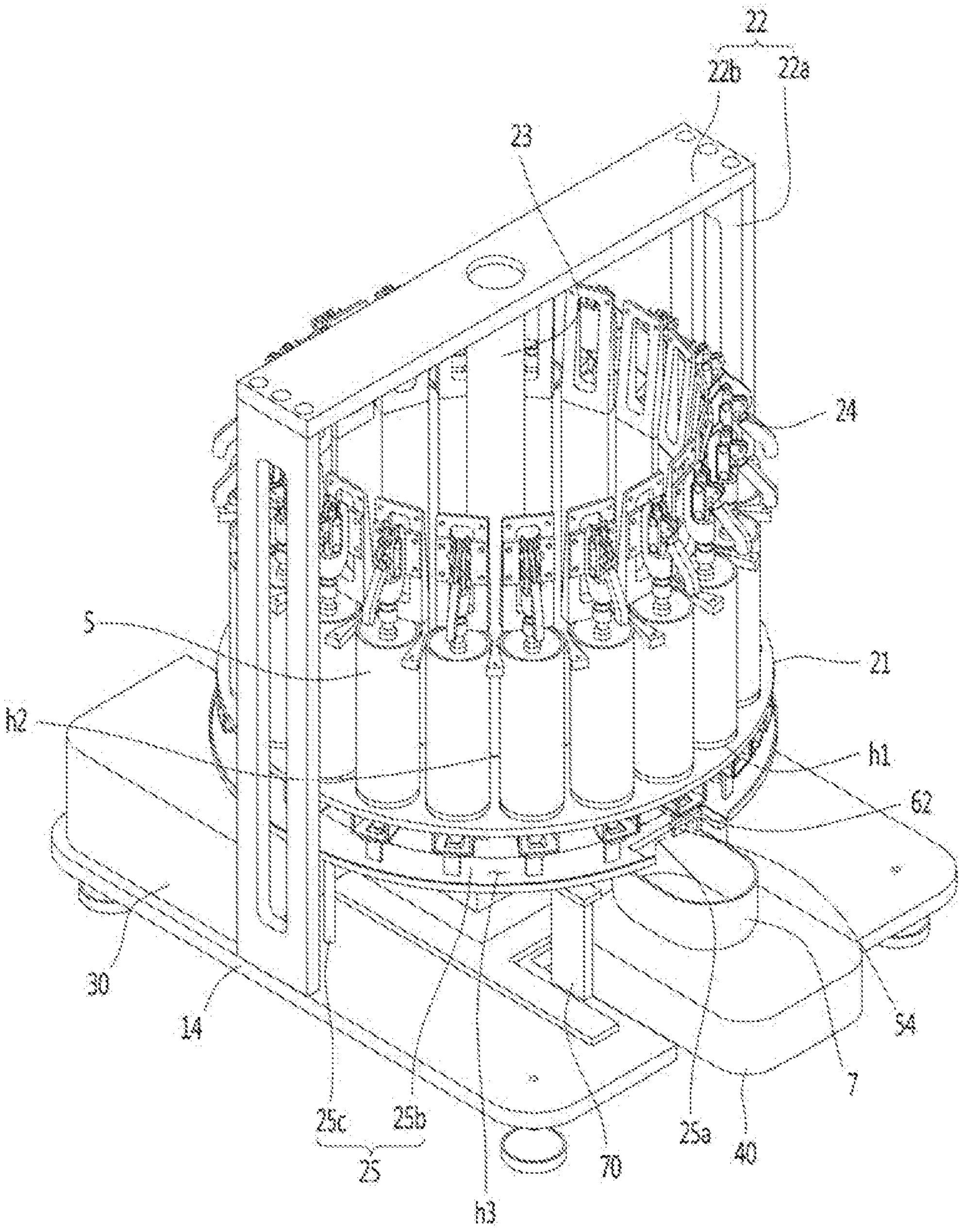

[Fig. 5]
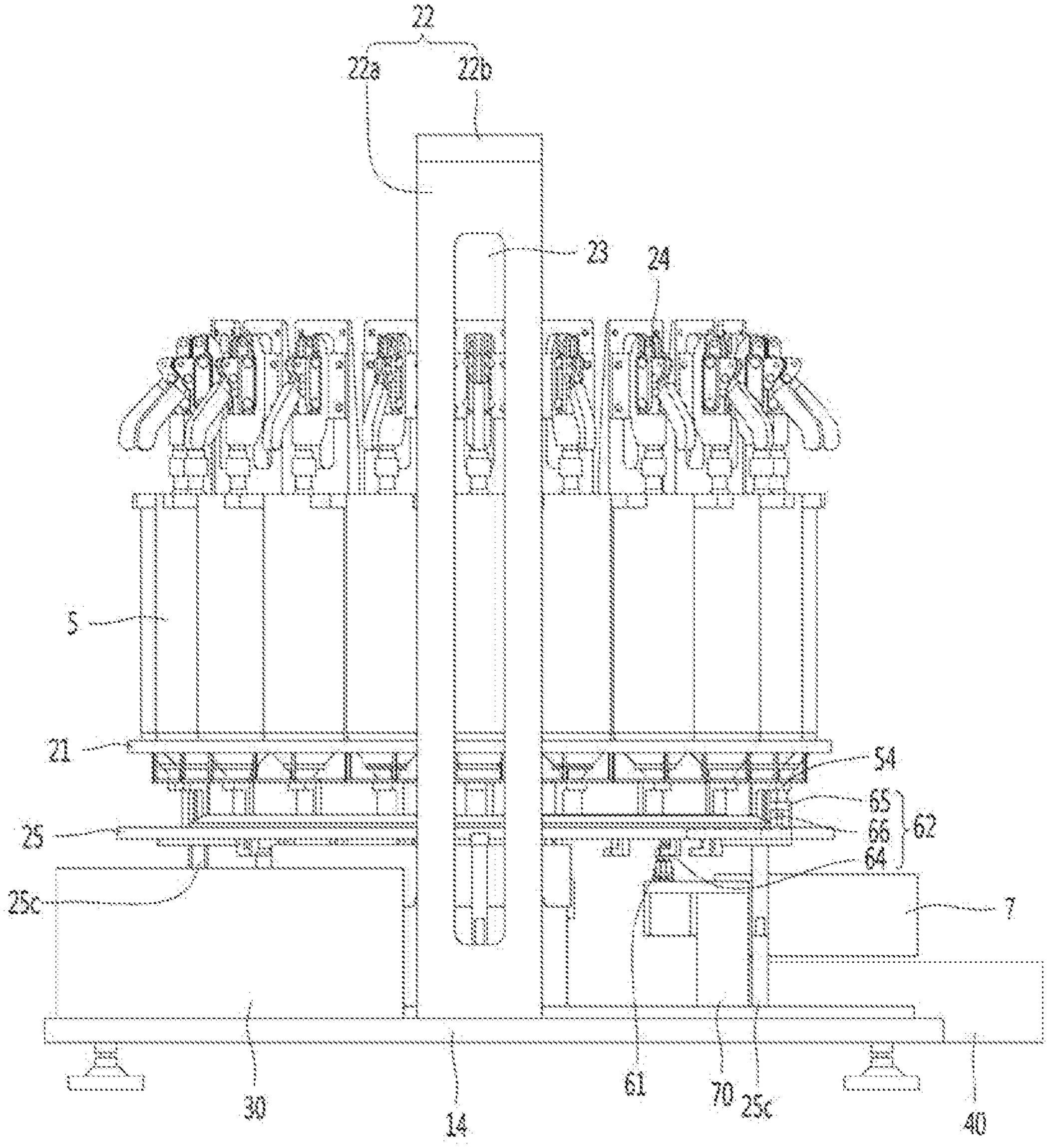

[Fig. 6]
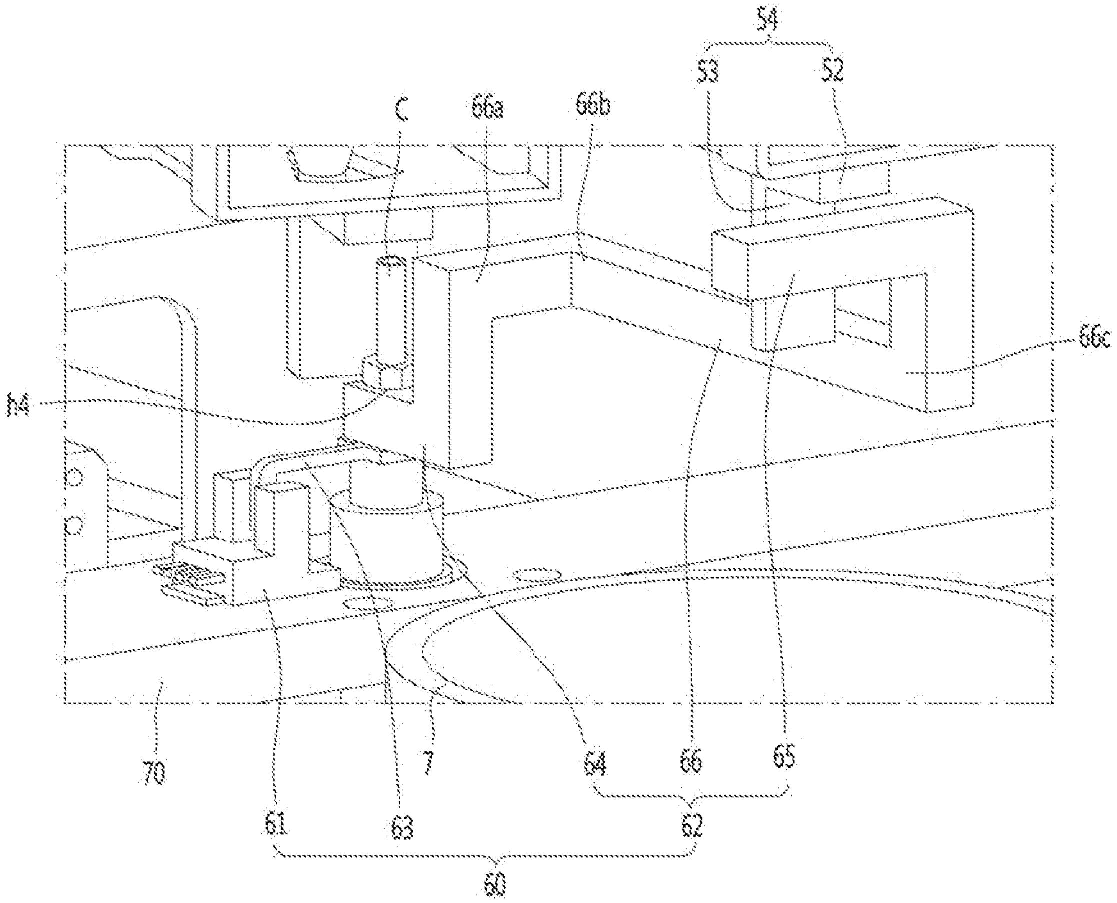
[Fig. 7a]
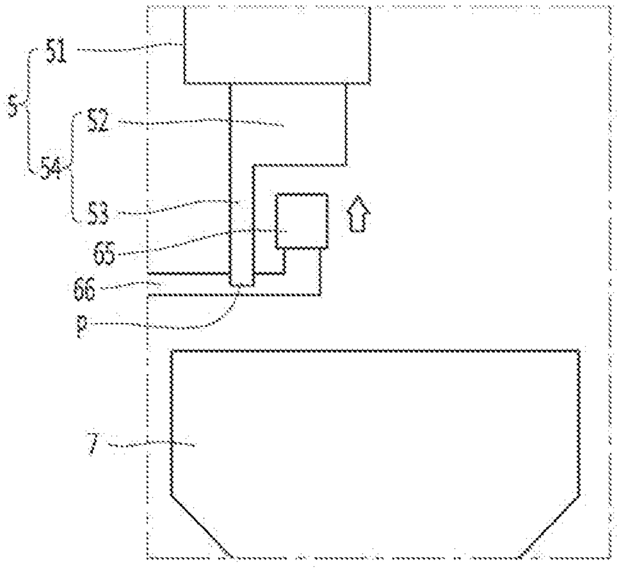

[Fig. 7b]
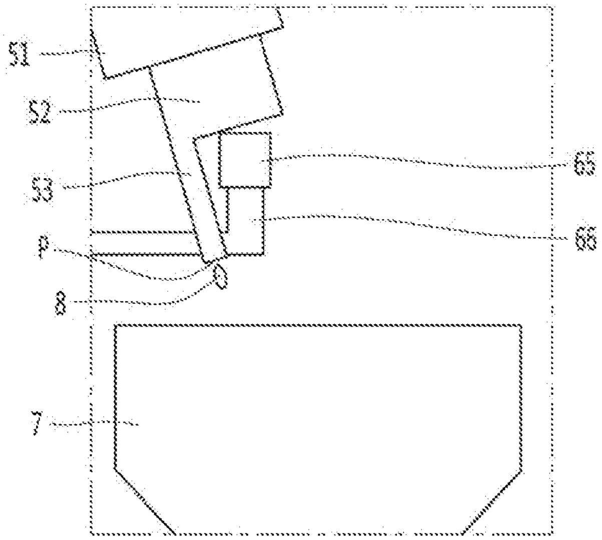

[Fig. 7c]
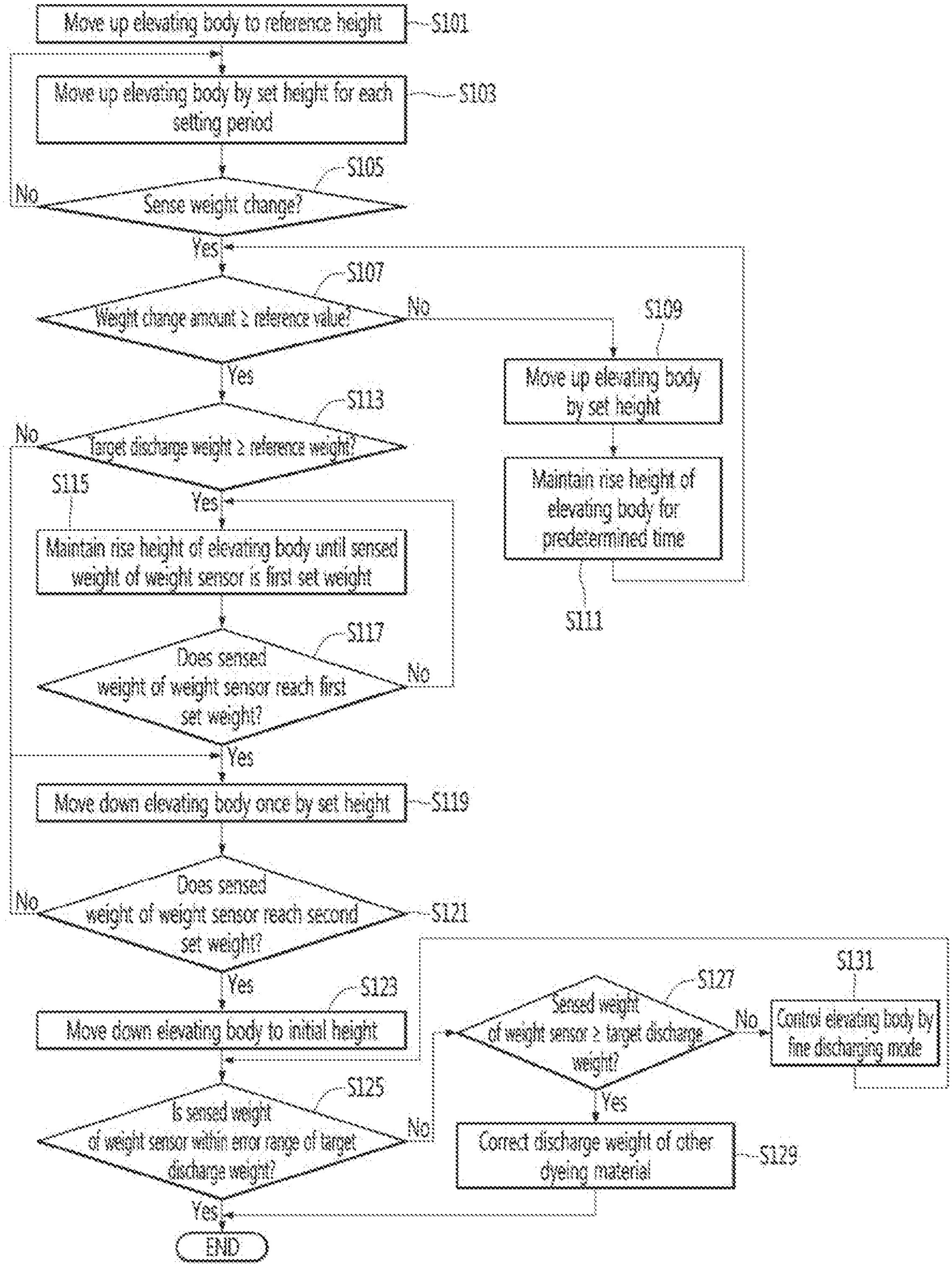

[Fig. 8]
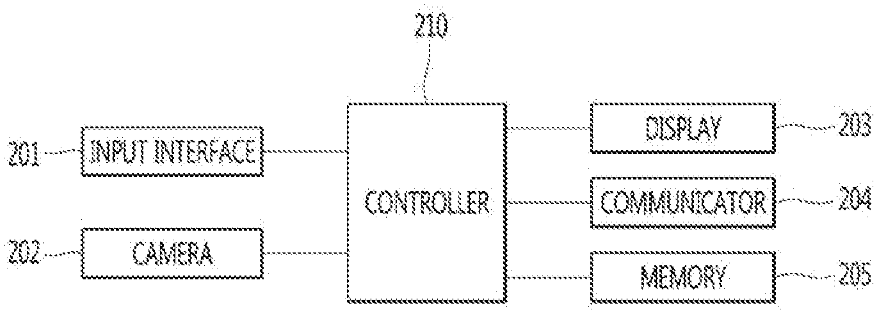
[Fig. 9]
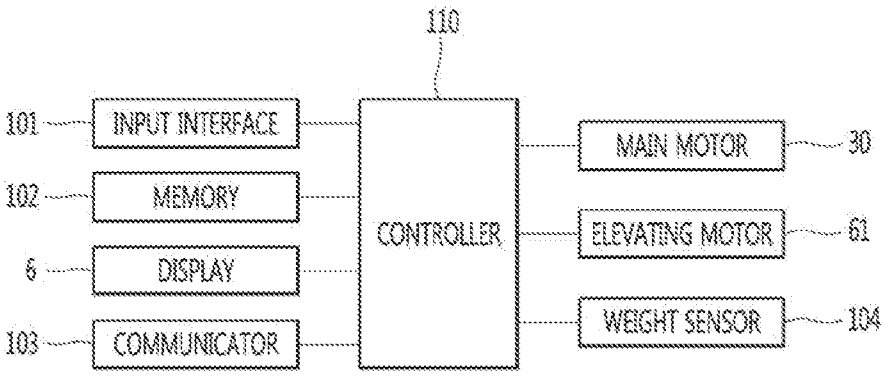

[Fig. 10]
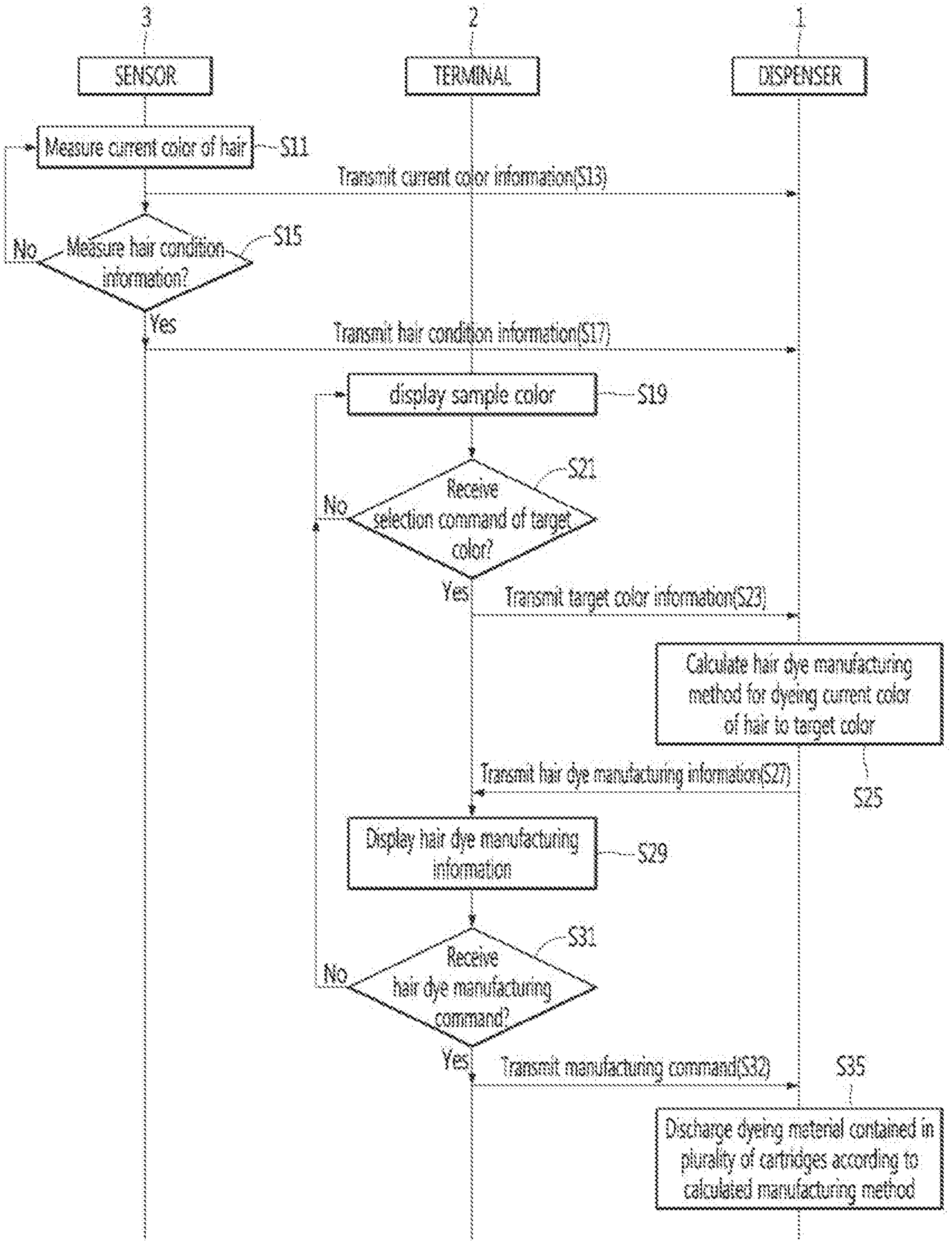

[Fig. 11]
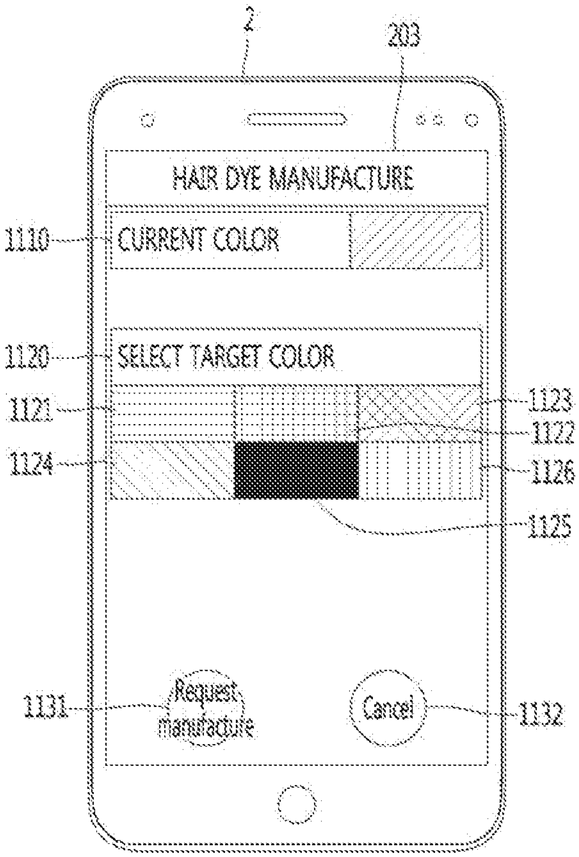

[Fig. 12]
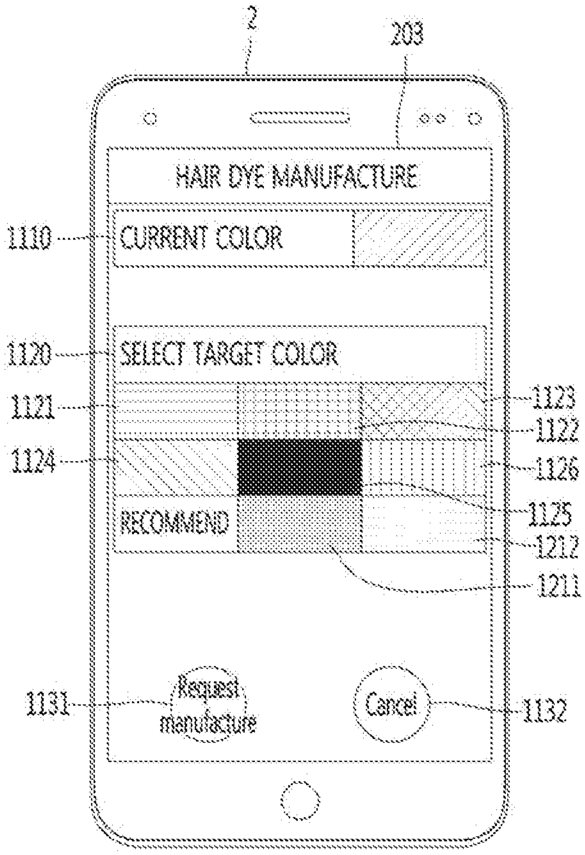

[Fig. 13]
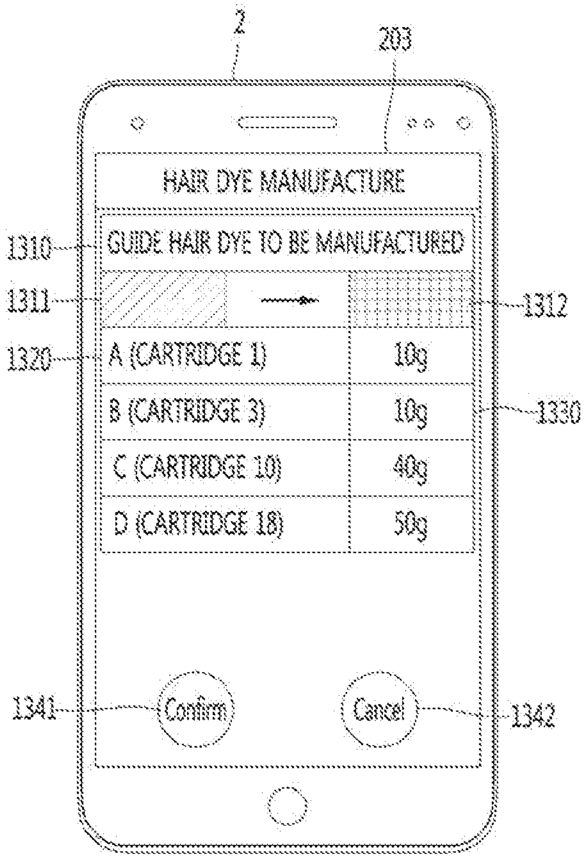

[Fig. 14]
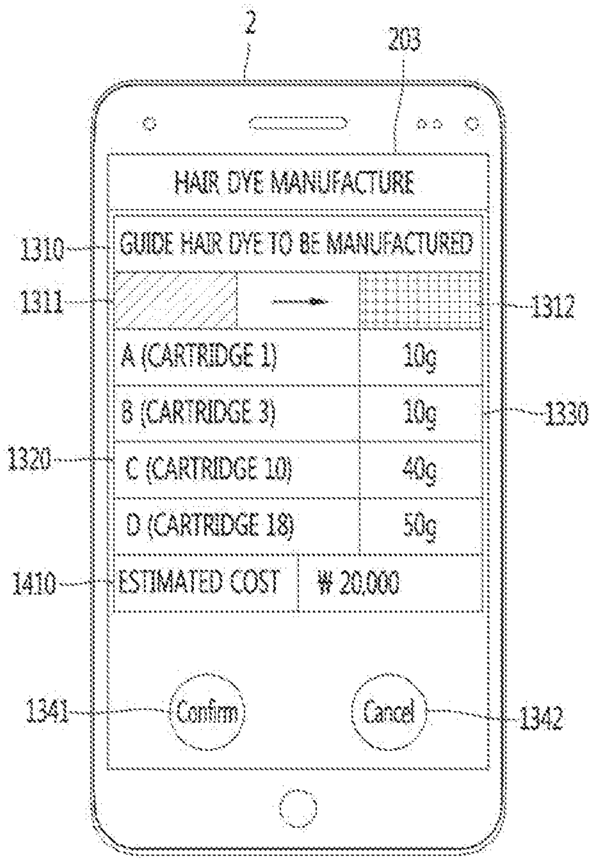

[Fig. 15]
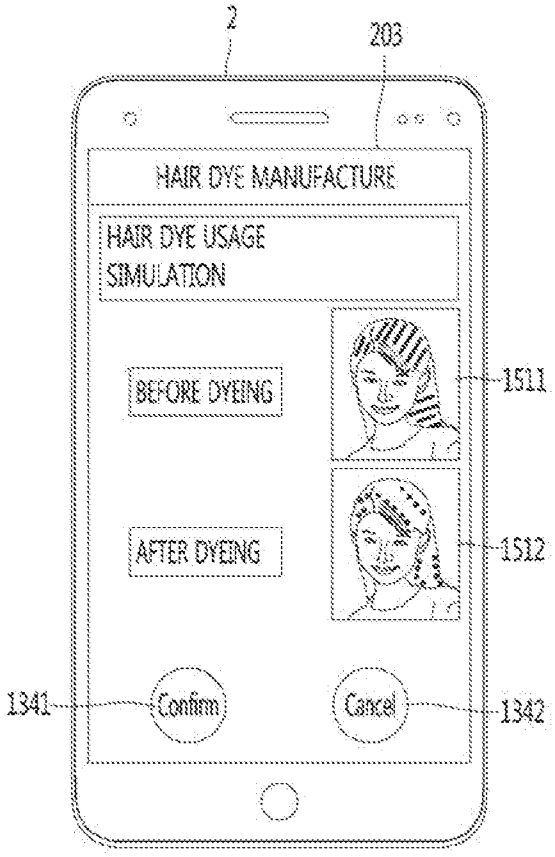
[Fig. 16]
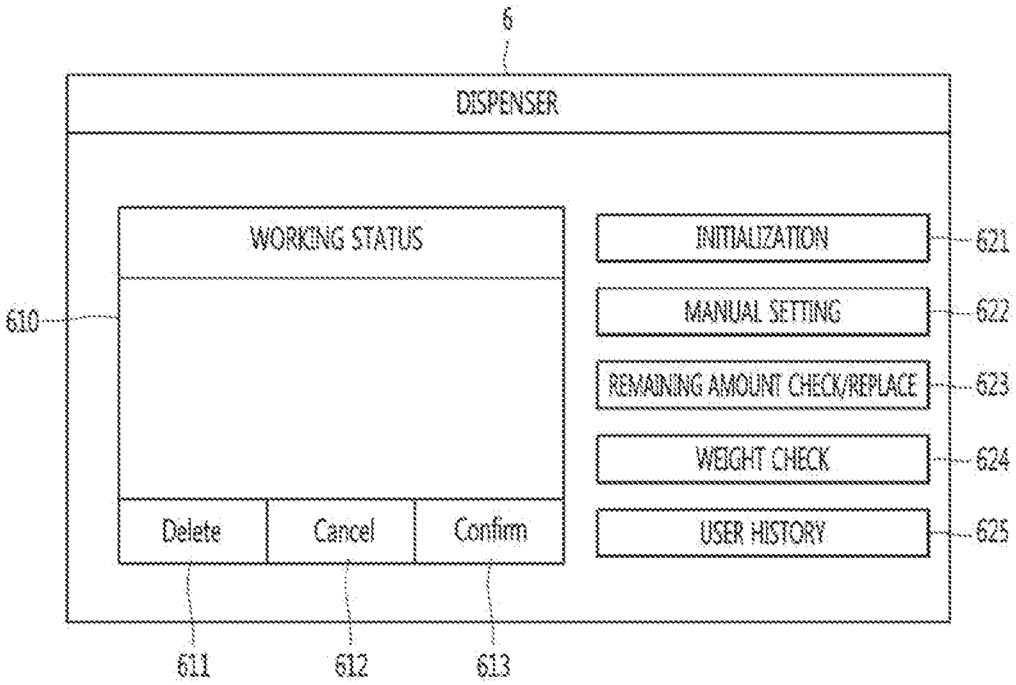

[Fig. 17]
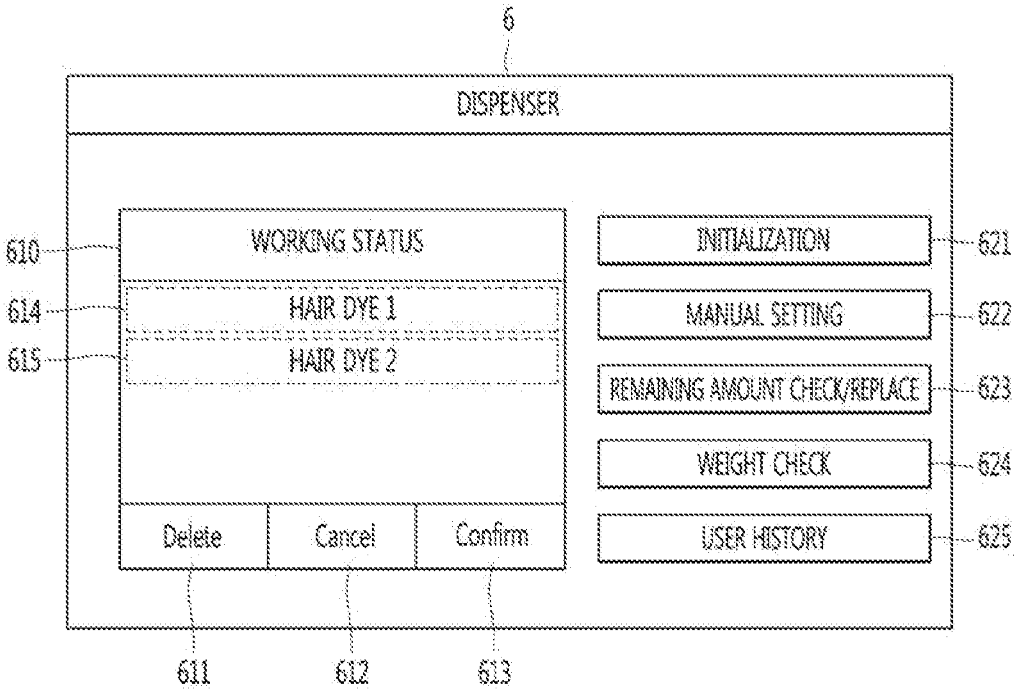
[Fig. 18]
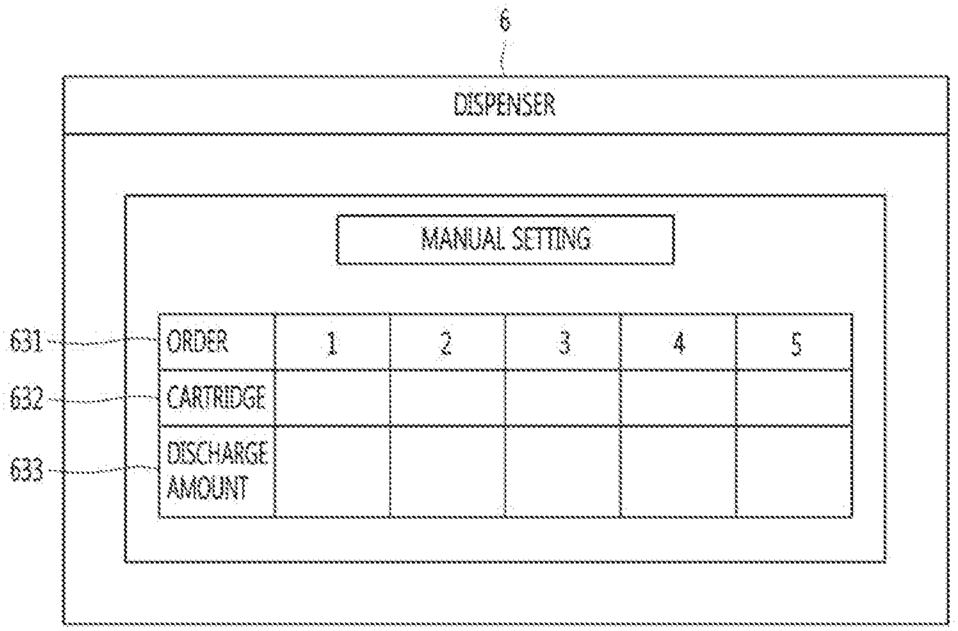

[Fig. 19]
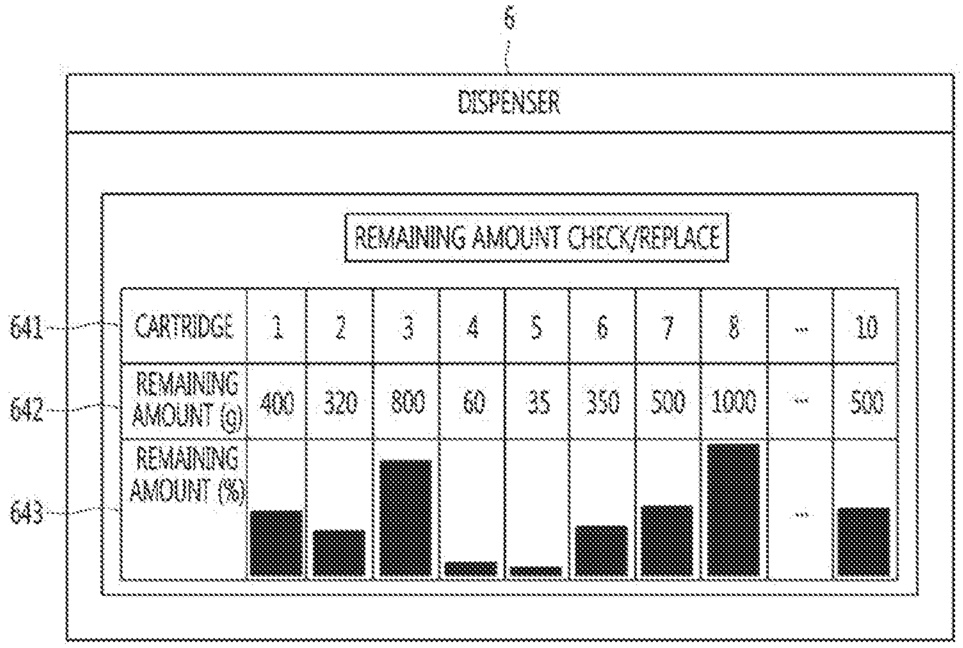
[Fig. 20]
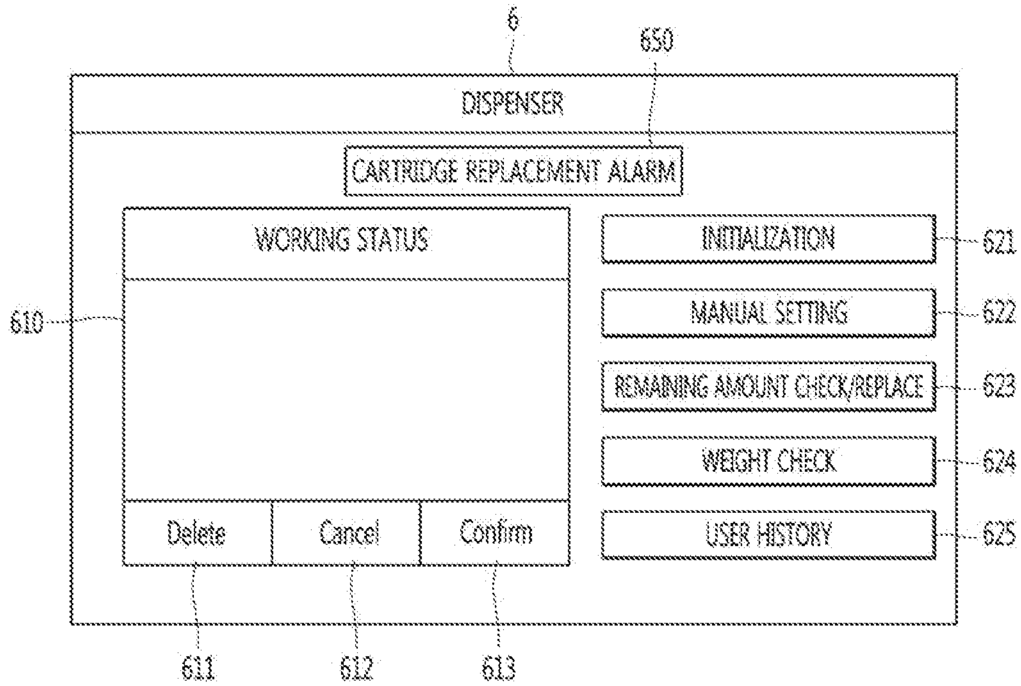

[Fig. 21]
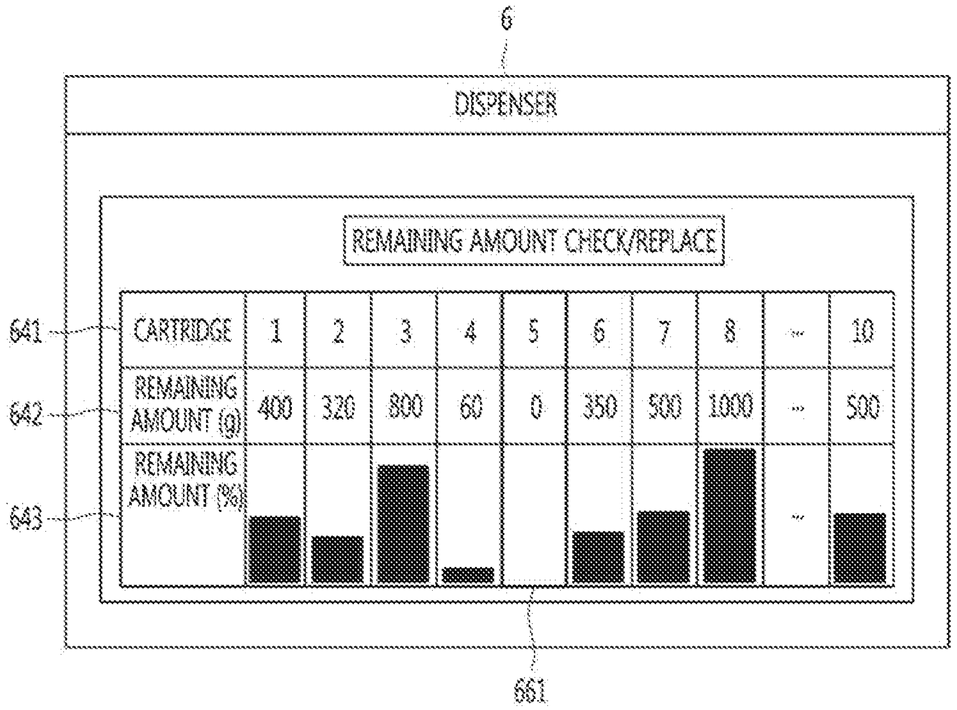
[Fig. 22]
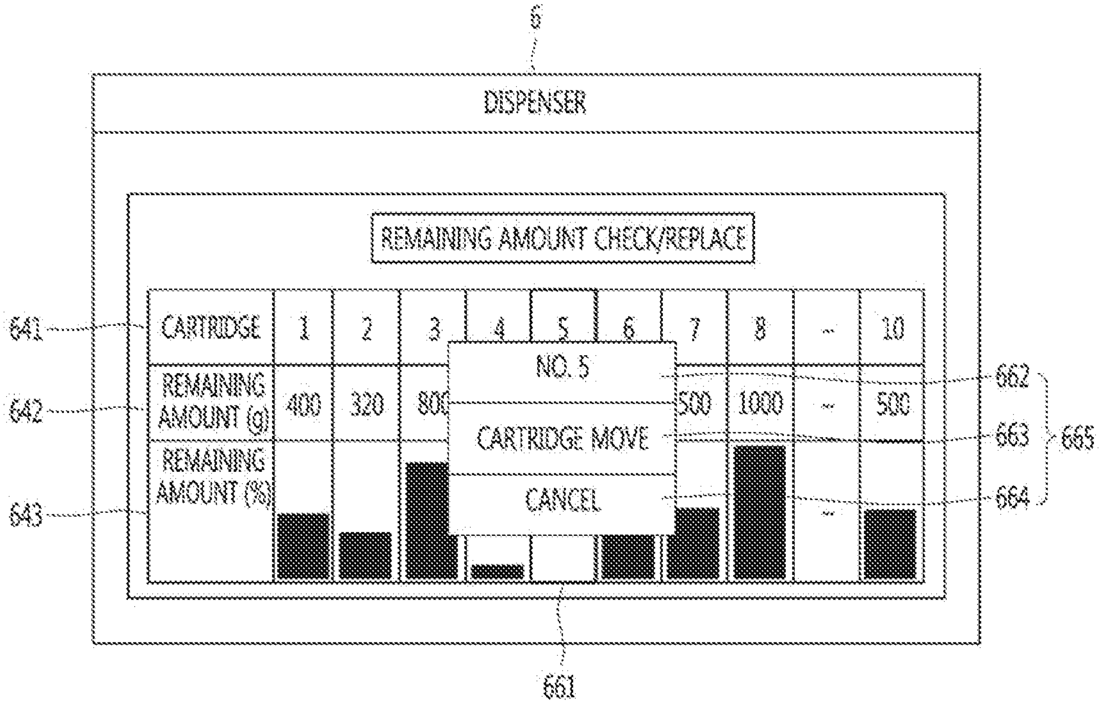

[Fig. 23]
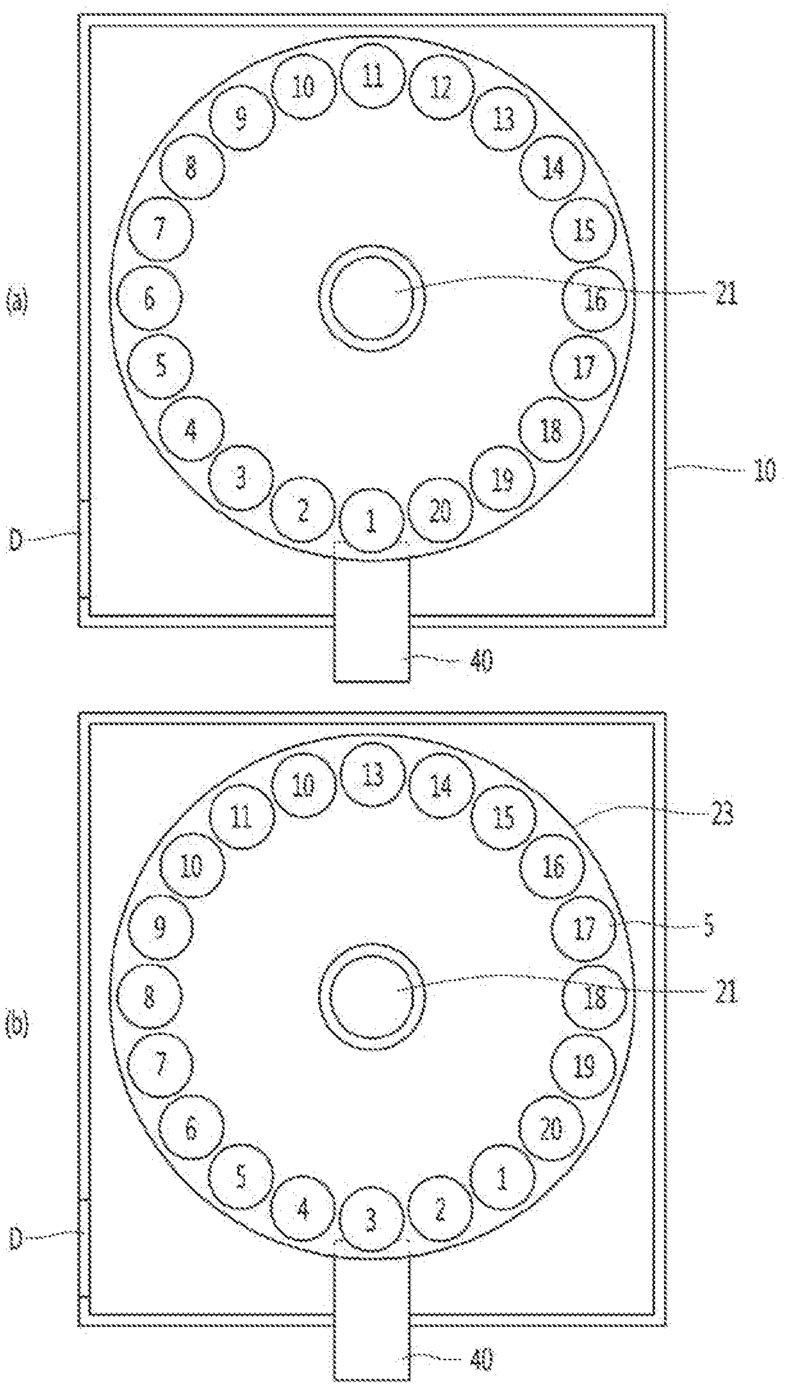

[Fig. 24]
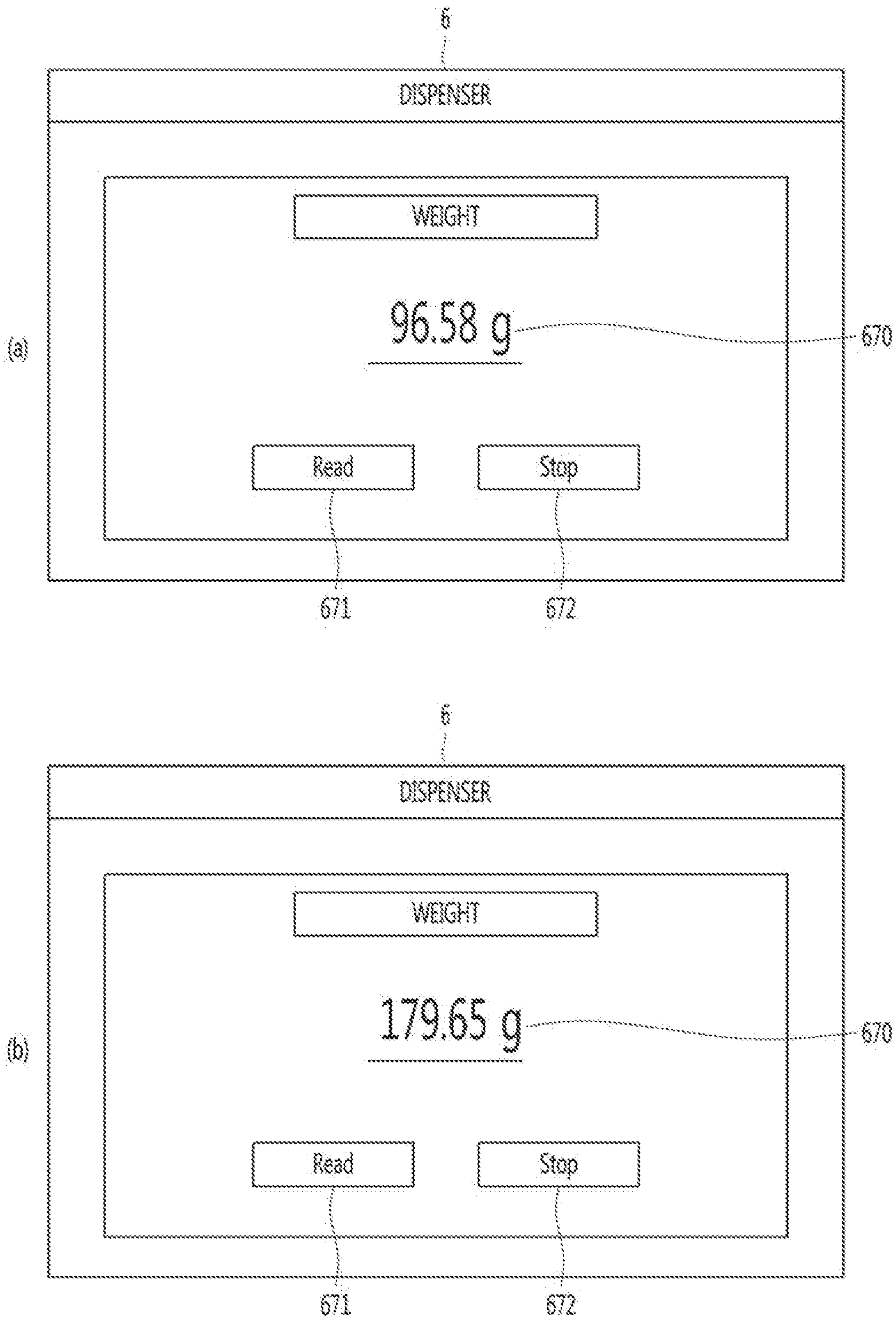

HAIR DYE DISPENSER AND SYSTEM COMPRISING THEREOF

CROSS REFERENCE TO RELATED APPLICATIONS

This application is a Divisional of copending application Ser. No. 17/266,932, filed on Feb. 8, 2021, which is the National Phase of PCT International Application No. PCT/KR2019/014066, filed on Oct. 24, 2019, which claims priority under 35 U.S.C. 119(a) to Patent Application No. 10-2018-0143539, filed in the Republic of Korea on Nov. 20, 2018 and Patent Application No. 10-2018-0143542, filed in the Republic of Korea on Nov. 20, 2018, all of which are hereby expressly incorporated by reference into the present application.

TECHNICAL FIELD

The present invention relates to a hair dye dispenser and a hair dye providing system including thereof.

BACKGROUND ART

A hair dye refers to a product that changes a color of hair using natural dyes or synthetic dyes. The hair dye may be used not only for the purpose of showing individuality, but also for the purpose of covering gray hair caused by aging, stress and the like, and a demand therefor tends to increase more and more.

Such hair dyes are mainly composed of various oxidation dyes depending on color, alkaline agents facilitating the penetration of the dyes, oxidizing agents helping the reaction of the dyes, and the like. Meanwhile, hair dyes consisting of natural, organic and hypoallergenic ingredients may be used instead of chemical ingredients for reasons of stability, side effects, and the like. In addition, the hair dye may be added with additional ingredients for the purpose of scalp protection, minimizing hair damage, strengthening of luster, minimizing of irritating fragrance and the like.

In the past, hair dyes were sold in a state that each of ingredients was combined and manufactured in color in advance, and a user mixed and used randomly manufactured hair dyes in the absence of hair dye of a desired color.

However, when mixing and using hair dyes in this way, there is a problem that the user experiences difficulties in dyeing with a desired color, since there is no quantitative hair dye mixing ratio.

In addition, hair dye has a limited problem in providing in a large capacity or automated manner since it is oxidized when exposed to air.

DISCLOSURE

Technical Problem

A first object of the present invention is directed to providing a hair dye dispenser that quantitatively manufactures a hair dye.

A second object of the present invention is directed to manufacturing and providing a user customized hair dye through a hair dye providing system.

Technical Solution

A hair dye dispenser according to an embodiment of the present invention includes a housing having an opening hole formed on one side of which a hair dye is provided, a plurality of cartridges disposed inside the housing and accommodating at least one dyeing material, a main body in which the plurality of cartridges are rotatably disposed, a main motor for rotating the main body so that a first cartridge of the plurality of cartridges is located adjacent to the opening hole, a discharge module for discharging the dyeing material contained in the first cartridge, and an accommodating body in which a basket accommodating the dyeing material discharged by the discharge module is placed, wherein the discharge module may include an elevating body that pressurizes the first cartridge when moving up and is separated from the first cartridge when moving down.

A container for storing the dyeing material and an actuator for discharging the dyeing material stored in the container may be formed in each of the plurality of cartridges, and a discharging body in which an exit is formed to move the dyeing material stored in the container to the outside, and an operating body that releases the exit according to pressure may be formed in the actuator.

The discharge module may further include an elevating motor for transmitting a driving force to the elevating body.

The elevating body may include a coupling body in which a through hole through which a coupling member connecting with the elevating motor passes is formed, a pressing body for applying pressure to the operating body when moving up, and a connecting body connecting the coupling body and the pressing body.

At least one bend may be formed in the connecting body.

A replacement door having a cross-sectional area greater than that of each of the plurality of cartridges may be formed on the other surface of the housing.

The hair dye dispenser may further include a pedestal for accommodating the dyeing material discharged from remaining cartridges excluding the first cartridge when the first cartridge of the plurality of cartridges is located adjacent to the opening hole.

A hair dye dispenser according to an embodiment of the present invention includes a housing having an opening hole formed on one side of which a hair dye is provided, a plurality of cartridges in which at least one dyeing material constituting the hair dye is accommodated and an actuator for discharging the dyeing material is formed, a main body supported by the housing and in which the plurality of cartridges are rotatably disposed, a main motor for rotating the main body, a discharge module including an elevating body for selectively driving the actuator by moving up or down, an accommodating body disposed through the opening hole and in which a basket accommodating the dyeing material discharged from one of the plurality of cartridges when the actuator is driven is disposed, and a controller receiving an input for a hair dye manufacturing method, wherein the controller may control the main motor and discharge module so as to discharge the dyeing material from at least one of the plurality of cartridges according to the hair dye manufacturing method.

The hair dye dispenser may further include a weight sensor disposed in the accommodating body and measuring a weight of the basket.

The hair dye manufacturing method may include type information and mass information of the dyeing material, and the controller may control the main motor so that a first cartridge is located in a discharging area based on the type information, and a rise height or a rise speed of the discharge module may be controlled so that the weight based on the mass information discharges the dyeing material from the first cartridge located in the discharging area.

The discharging area may be an area having a shortest separation distance from the accommodating body among regions in which each of the plurality of cartridges may be located by the rotation of the main body.

The hair dye dispenser may further include a display for displaying remaining amount information of the dyeing material accommodated in each of the plurality of cartridges.

A replacement door having a cross-sectional area greater than that of each of the plurality of cartridges may be formed on the other surface of the housing, and the controller may control the main motor so that a second cartridge is located in a replacing area when receiving a replacement command for selecting the second cartridge among the plurality of cartridges.

The replacing area may be an area having a shortest separation distance from the replacement door among the areas in which each of the plurality of cartridges may be located by the rotation of the main body.

A hair dye providing system according to an embodiment of the present invention, the hair dye providing system having a dispenser as an element, which discharges a dyeing material contained in a plurality of cartridges (a plurality of containers) and provides a hair dye, includes a sensor for measuring a current color of hair, a terminal for receiving a command for selecting a target color, and a dispenser for receiving current color information from the sensor, receiving target color information from the terminal, calculating a method of hair dye manufacture for dyeing the hair from the current color to the target color, and discharging a dyeing material contained in the plurality of cartridges according to a manufacturing method to provide the hair dye.

The method of hair dye manufacture may include kind and weight information of the dyeing material to be discharged from the plurality of cartridges.

The terminal may display a plurality of sample colors, and when receiving a command for selecting any one of the plurality of sample colors, the terminal may display a simulation image hair dyed with a selected sample color.

The sensor may further sense at least one of a degree of damage and a degree of dryness of the hair, and the dispenser may calculate the method of hair dye manufacture for dyeing the hair from the current color to the target color based on at least one of the degree of damage and the degree of dryness.

The terminal may display at least one recommended color.

The recommended color may be a color calculated so that it may be manufactured based on a type of the dyeing material contained in the plurality of cartridges and a remaining amount of the dyeing material.

The recommended color may be a color calculated to minimize hair damage.

The recommended color may be a color calculated so that the color may be developed based on a hair condition measured by the sensor.

The terminal may display at least one of ingredient information and price information of hair dye to be used at a time of dyeing with the target color.

The terminal or dispenser may store a hair dye usage history for each of a plurality of users.

The hair dye usage history use may include at least one of ingredient information of a previously used dye, an image of a hair dyeing result, and an accuracy of the hair dyed color versus the target color.

The dispenser may correct the manufacturing method of the hair dye calculated based on the hair dye usage history.

The dispenser may include a housing having an opening hole formed therein to provide a hair dye, a plurality of cartridges having an internal space in which a dyeing material is accommodated and an actuator for discharging the dyeing material, a main body supported by the housing and having the plurality of cartridges rotatably disposed, a main motor for rotating the main body according to a hair dye manufacturing method, a discharge module for driving the actuator, and an accommodating body located through the opening hole and in which a basket accommodating the dyeing material discharged from one of the plurality of cartridges when the actuator is driven is disposed on an upper surface thereof.

Advantageous Effects

According to an embodiment of the present invention, there is an advantage that a hair dye may be reliably provided by quantitatively manufacturing the hair dye.

In addition, a hair dye dispenser capable of accommodating a large amount of dyeing material may be provided by blocking the dyeing material stored in a container from outside air. Further, there is an advantage that the hair dye may be provided in an automated manner through the hair dye dispenser accommodating the large amount of the dyeing material.

Further, there is an advantage that discharging of dyeing material in an unintended direction may be minimized by forming an elevating body pressing an actuator formed in a cartridge to discharge the dyeing material so as not to intersect with a discharge direction of the dyeing material.

Furthermore, there is an advantage that it is easy to clean the inside of a dispenser and cleanliness of the inside of the dispenser may be improved by further including a pedestal accommodating dyeing material discharged from an unintended region.

In addition, when replacing a cartridge, there is an advantage that a user may easily replace the cartridge by moving the cartridge to be replaced to an area closest to a replacement door.

According to an embodiment of the present invention, a user customized hair dye may be provided by manufacturing a hair dye capable of dyeing with a color that a user intends to dye based on a current color of the user's hair when the hair dye is provided. Accordingly, there is an advantage that a possibility of dyeing with the color intended by the user is maximized and satisfaction of the user may be improved.

In addition, there is an advantage that it is possible to manufacture quantitatively a hair dye and reliability is improved by setting the kind and weight of dyeing material discharged from a plurality of cartridges when the hair dye is manufactured.

Further, there is an advantage that it is possible to help a user to select a hair dye by displaying a simulation image for predicting a result of dyeing before providing the hair dye.

Furthermore, there is an advantage that it is possible to provide a hair dye suitable for a user's hair condition, such as minimizing damage to the user's hair due to dyeing by manufacturing the hair dye based on at least one of a degree of damage and a degree of dryness of the user's hair.

In addition, there is an advantage that a dyeing material contained in a cartridge may be used efficiently by recommending a hair dye suitable for a current state of a dispenser.

In addition, there is an advantage that it is possible to provide a hair dye suitable for hair characteristics of an individual user through a hair dye usage history corresponding to each of a plurality of users.

DESCRIPTION OF DRAWINGS

FIG. 1 is a block diagram of a hair dye providing system according to an embodiment of the present invention.

FIG. 2 is a front view of a dispenser according to an embodiment of the present invention.

FIG. 3 is a side view of a dispenser according to an embodiment of the present invention.

FIG. 4 is a perspective view illustrating the inside of a dispenser according to an embodiment of the present invention.

FIG. 5 is a side view illustrating the inside of a dispenser according to an embodiment of the present invention.

FIG. 6 is an enlarged view of a discharge module shown in FIGS. 4 and 5.

FIGS. 7*a* and 7*b* are views showing discharging of a dyeing material in a cartridge according to an embodiment of the present invention.

FIG. 7*c* is a flowchart showing a method of controlling a discharge amount of a dyeing material according to an embodiment of the present invention.

FIG. 8 is a control block diagram of a terminal according to an embodiment of the present invention.

FIG. 9 is a control block diagram of a dispenser according to an embodiment of the present invention.

FIG. 10 is a flowchart showing a method of operating a hair dye providing system according to an embodiment of the present invention.

FIG. 11 is an illustrative view showing a method of displaying a sample color according to a first embodiment of the present invention.

FIG. 12 is an illustrative view showing a method of displaying a sample color according to a second embodiment of the present invention.

FIG. 13 is an illustrative view showing a method of displaying hair dye manufacturing information according to the first embodiment of the present invention.

FIG. 14 is an illustrative view showing a method of displaying hair dye manufacturing information according to the second embodiment of the present invention.

FIG. 15 is an illustrative view showing a method of displaying hair dye manufacturing information according to a third embodiment of the present invention.

FIG. 16 is one example of a screen displayed by a display of a dispenser according to an embodiment of the present invention.

FIG. 17 is an illustrative view showing a working status list according to an embodiment of the present invention.

FIG. 18 is an illustrative view showing a method of manually setting a hair dye according to an embodiment of the present invention.

FIG. 19 is an illustrative view showing a cartridge remaining amount check screen according to an embodiment of the present invention.

FIG. 20 is an illustrative view showing a screen in which a dispenser according to an embodiment of the present invention outputs a remaining amount check/replace notification of a cartridge.

FIG. 21 is an illustrative view showing a cartridge remaining amount check screen after a cartridge replacement alarm according to an embodiment of the present invention is output.

FIG. 22 is an illustrative view showing a cartridge replacement screen according to an embodiment of the present invention.

FIG. 23 is an illustrative view showing a location change of a cartridge when receiving a cartridge replacement command according to an embodiment of the present invention.

FIG. 24 is an illustrative view showing a method of displaying a weight of a dyeing material discharged from a dispenser according to an embodiment of the present invention.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

The suffixes "module" and "unit" for components used in the description below are assigned or mixed in consideration of easiness in writing the specification and do not have distinctive meanings or roles by themselves.

In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different refer toing from the context.

Terms such as "include" or "has" are used herein and should be understood that they are intended to indicate an existence of several components, functions or steps, disclosed in the specification, and it is also understood that greater or fewer components, functions, or steps may likewise be utilized FIG. 1 is a block diagram of a hair dye providing system according to an embodiment of the present invention.

The hair dye providing system according to the embodiment of the present invention may include at least some or all of a dispenser 1, a terminal 2 and a sensor 3. The dispenser 1, the terminal 2 and the sensor 3 may communicate with each other to transmit and receive signals.

The dispenser 1 may include a plurality of dyeing materials, and when receiving a manufacturing command, may discharge at least one dyeing material to provide a hair dye.

Here, the dyeing material refers to ingredients used in hair dye manufacture, and the hair dye may refer to a product in which at least one dyeing material is discharged and provided.

The dyeing material may include both chemical and natural ingredients, and may include oxidation dyes, natural dyes, oxidizing agents, and alkali agents to express a color, and auxiliary ingredients to protect hair. For example, oxidation dyes may include paraphenylenediamine which represents black, paratoluenediamine which represents blackish brown, and mononitrophenylenediamine which represents red, and the oxidizing agents include hydrogen peroxide, peroxide, sodium borate, and the like, and the alkali agents may include ammonia, a surfactant, monoethanolamine, and the like.

In addition, the dyeing material may include acid dyes, basic dyes, HC dyes, direct dyes, decolorizing agents, and the like.

Meanwhile, according to the embodiment, the dyeing material may be a compound in which two or more chemical ingredients are mixed, a compound in which two or more natural ingredients are mixed, or a compound in which one or more chemical ingredients and one or more natural components are mixed.

The hair dye may be manufactured by discharging at least one of the above-described dyeing materials so as to be suitable for use on a user's hair, by discharging any one of the plurality of dyeing materials, or by discharging two or more of the plurality of dyeing materials.

The terminal 2 may receive a command to select a target color from a user. The terminal 2 may display at least one sample color, and receive a command to select any one of the displayed sample colors.

Here, the sample color represents a color of the hair dyed hair in advance, which may refer to an example color. The target color is a color the user wishes to dye, and may be a color selected by the user so as to be hair dyed by the hair dye to be manufactured.

The terminal 2 may be capable of wired/wireless communication, and may be a device providing a display and an input interface, and may include a mobile terminal such as a smart phone, a smart watch, a tablet, a personal computer (PC), and the like, but it is merely illustrative, and the present invention is not limited thereto.

Meanwhile, the dispenser 1 and the terminal 2 are shown as being separated in FIG. 1, but the dispenser 1 and the terminal 2 may be integrally formed.

The sensor 3 may measure a color of hair to be hair dyed. Specifically, the sensor 3 may measure a current color representing the color of hair before hair dyeing and a result color representing the color of hair after dyeing. In addition, the sensor 3 may measure a color of hair during dyeing.

The sensor 3 may be a spectrophotometer. That is, the sensor 3 may measure the current color of hair by contacting the hair or by obtaining a value of three properties of the hair at a location adjacent to the hair.

In the hair dye providing system according to the embodiment of the present invention, the sensor 3 measures the current color of the hair and transmits current color information to the dispenser 1, and the terminal 2 may transmit target color information to the dispenser 1 after receiving the command to select the target color. When receiving the current color information from the sensor 3 and the target color information from the terminal 2, the dispenser 1 may calculate a hair dye manufacturing method for dyeing the hair from the current color to the target color, and discharge the dyeing material according to the calculated hair dye manufacturing method to provide the hair dye.

FIG. 2 is a front view of a dispenser according to an embodiment of the present invention, FIG. 3 is a side view of a dispenser according to an embodiment of the present invention, FIG. 4 is a perspective view illustrating the inside of a dispenser according to an embodiment of the present invention, FIG. 5 is a side view illustrating the inside of the dispenser according to the embodiment of the present invention, and FIG. 6 is an enlarged view of a discharge module shown in FIG. 4 and FIG. 5.

The dispenser 1 may include a housing 10, a plurality of cartridges 5 disposed inside the housing 10 and accommodating dyeing material, a main body 20 in which the plurality of cartridges 5 are rotatably disposed, a main motor 30 rotating the plurality of cartridges 5, a discharge module 60 driven when the dyeing material accommodated in the plurality of cartridges 5 is discharged, and an accommodating body 40 for providing a hair dye made of the dyeing material discharged from the plurality of cartridges 5.

The housing 10 may protect elements accommodated inside the dispenser 1. The plurality of cartridges 5, the main body 20, the main motor 30, the discharge module 60, and the accommodating body 40 may be disposed inside the dispenser 1.

The housing 10 may be in a hexahedral shape with a space formed therein. Preferably, the housing 10 may be in a rectangular parallelepiped shape or a cubic shape in which each face is rectangular. For example, the housing 10 may include a first surface 11 to a sixth surface 16.

The first surface 11 is a front of the dispenser 1, and an opening hole 9 and a display 6 which will be described later may be formed thereon. The second surface 12 is a surface facing the first surface 11, and may be a rear surface. The third surface 13 may be an upper surface, and the fourth surface 14 may be a lower surface and a surface facing the third surface 13. The fifth surface 15 and the sixth surface 16 may be a left surface and a right surface, respectively.

A replacement door D for replacing the cartridge 5 may be formed on at least one of the first to sixth surfaces 11 to 16. For example, the replacement door D may be formed on any one of the second surface 12, the fifth surface 15, and the sixth surface 16, and preferably the replacement door D is formed on the fifth surface 15 as shown in FIG. 3. However, it is merely an example for the convenience of description, and the present invention is not limited thereto.

A cross-sectional area of the replacement door D may be larger than that of each of the plurality of cartridges 5. Accordingly, each of the plurality of cartridges 5 may pass through the replacement door D, and a user may replace the cartridge 5 via the replacement door D.

In addition, a vent hole 15*a* may be formed on at least one of the first to sixth surfaces 11 to 16. For example, the vent hole 15*a* may be formed on any one of the second and third surfaces 12 and 13 and the fifth and sixth surfaces 15 and 16, and preferably, the vent hole 15*a* may be formed in the fifth surface 15 as shown in FIG. 3. However, it is merely an example for the convenience of description, and the present invention is not limited thereto. The vent hole 15*a* may be one or in plural.

The shape of the housing 10 shown in the drawings is merely illustrative, and the present invention is not limited thereto.

The opening hole 9 through which a hair dye is provided may be formed on the first surface 11 of the housing 10.

The opening hole 9 may be a hole formed to provide the hair dye to the user. The opening hole 9 may be a passage through which a hair dye made of the dyeing material discharged from the plurality of cartridges 5 is provided to the outside.

Each of the plurality of cartridges 5 accommodates at least one dyeing material constituting the hair dye, and an actuator 54 may be formed to discharge the dyeing material accommodated in each of the plurality of cartridges 5.

A basket 7 receiving the dyeing material discharged from the plurality of cartridges 5 may be located inside the dispenser 1 through the opening hole 9 or may be located outside the dispenser 1. The user may put the basket 7 inside the dispenser 1 through the opening hole 9 or take it to the outside.

The dispenser 1 may further include the accommodating body 40 supporting basket 7. The accommodating body 40 may be disposed through the opening hole 9. The basket 7 may be carried into the housing 10 through the opening hole 9 and placed on an upper surface of the accommodating body 40 or may be carried out of the housing 10 through the opening hole 9. The accommodating body 40 may be disposed across the opening hole 9, and the basket 7 accommodating the dyeing material may be disposed in the accommodating body 40.

Meanwhile, the display 6 may be further formed on the first surface 11 of the housing 10. That is, as shown in FIG. 2, the opening hole 9 and the display 6 may be formed on the same surface of the housing 10. However, according to the embodiment, each of the opening hole 9 and the display 6 may be formed on different surfaces of the housing 10.

The display 6 may display various information related to the hair dye provision.

As shown in FIG. 4, the main body 20 includes a mounting body 21 in which a plurality of mounting holes h1 are formed, in which the plurality of cartridges 5 are mounted, a supporting body 22 supported by the housing 10 and supporting the mounting body 21, and a power transmission shaft 23 mounted on the supporting body 22 and transmitting power of the main motor 30 to the mounting body 21.

The mounting body 21 may have a circular outer circumference, and the plurality of mounting holes h1 may be formed to be spaced apart in a circumferential direction. Each of the plurality of cartridges 5 may be disposed through each of the plurality of mounting holes h1. In particular, each of the plurality of cartridges 5 may be disposed so that the actuator 54 passes through each of the plurality of mounting holes h1 and faces downward.

The supporting body 22 may be disposed to be in contact with at least one surface of the housing 10 to support the main body 22 so as not to move in a horizontal or vertical direction. Specifically, the supporting body 22 may include a pair of first supports 22*a* and a second support 22*b* disposed between the pair of first supports 22*a*, and the second support 22*b* may connect an upper end of each of the pair of first supports 22*a*. A lower end of each of the pair of first supports 22*a* may be supported in contact with a lower surface 14 of the housing 10.

One end of the power transmission shaft 23 may be connected to the main motor 30, and the other end thereof may be mounted on the second support 22*b*.

A part of the power transmission shaft 23 may be disposed to pass through a center hole h2 formed at a center of the mounting body 21. The power transmission shaft 23 may transmit the power of the main motor 30 to the mounting body 21. For example, a mounting groove (not shown) in which the mounting body 21 is disposed may be formed in the power transmission shaft 23, and the mounting body 21 is disposed in a form accommodated in the mounting groove, so that the driving force of the main motor 30 may be transmitted to the mounting body 21. Accordingly, the mounting body 21 is rotated by the driving of the main motor 30, so that the plurality of cartridges 5 may be rotated.

The main body 20 may further include a plurality of fixing modules 24 for fixing each of the plurality of cartridges 5, and the fixing module 24 may mount the cartridge 5 to the mounting body 21 or detach the cartridge 5 from the mounting body 21 according to applied pressure. The user may apply pressure to the fixing module 24 to mount or detach the cartridge 5 to or from the mounting body 21.

Meanwhile, the dispenser 1 may further include a pedestal 25 disposed below the mounting body 21 and receiving a part of the dyeing material accommodated in the plurality of cartridges 5. The pedestal 25 may accommodate the dyeing material discharged out of the basket 7 among the dyeing materials discharged from the plurality of cartridges 5.

The pedestal 25 may include an accommodation portion 25*b* in which an opening 25*a* is formed in the vertical direction and at least one support 25*c* supporting the accommodation portion 25*b*. The support 25*c* is placed on the lower surface 14 of the housing 10, and may support the accommodation portion 25*b*.

The accommodation portion 25*b* may be disposed at a location in which the opening 25*a* is formed in parallel with the accommodating body 40 in the vertical direction. The accommodation portion 25*b* may be disposed so that the opening 25*a* is located in a discharging area described later. Accordingly, the dyeing material discharged from the cartridge 5 may be accommodated in the basket 7 through the opening 25*a*. Meanwhile, the dyeing material discharged from the cartridge 5 disposed at a location not in parallel with the basket 7 in the vertical direction may be accommodated in an accommodating groove h3 formed in the accommodation portion 25*b*.

Accordingly, it is possible to minimize contamination of the inside of the housing 10 by discharging the dyeing material discharged out of the basket 7 to any location in the housing 10. Since the accommodation portion 25*b* is supported in a form placed on the support 25*c*, the user may lift the accommodation portion 25*b* upward from the support 25*c* to easily separate the accommodation portion 25*b*, and discharge and easily clean the dyeing material accommodated in the accommodation portion 25*b*.

The dispenser 1 may further include a controller 110 for controlling the main motor 30 and the discharge module 60 so as to discharge the dyeing material from at least one of the plurality of cartridges 5 according to a hair dye manufacturing method.

The controller 110 may be disposed inside the display 6, but it is merely illustrative, and the controller 110 may be disposed at any location within the housing 10.

The controller 110 may receive dyeing-related information from a communicator 103 described later, or may receive dyeing-related information from the display 6 composed of a touch panel to calculate the hair dye manufacturing method.

The hair dye manufacturing method may include information on a type of the dyeing material to be discharged and information on an amount of the dyeing material to be discharged.

The controller 110 may control the main motor 30 and the discharge module 60 so that the dyeing material is discharged at a predetermined amount from at least one cartridge 5 according to the hair dye manufacturing method.

The main motor 30 may generate a driving force and the driving force generated in the main motor 30 is transmitted to the mounting body 21 through the power transmission shaft 23 to rotate the mounting body 21. The controller 110 may control the main motor 30 to locate the cartridge 5 accommodating the dyeing material to be discharged in the discharging area.

Here, the discharging area may refer to a location in which the cartridge 5 accommodating the dyeing material to be discharged is disposed in parallel with the discharge module 60 in the vertical direction.

When the dyeing material to be discharged is located in the discharging area, the controller 110 may control the discharge module 60 to control a discharging amount of the dyeing material.

The controller 110 may control at least one of a rise height and a rise speed of the discharge module 60 to control the discharge amount of the dyeing material.

A sub-body 70 on which the discharge module 60 is mounted may be formed in the housing 10, and the discharge module 60 may be mounted on the sub-body 70.

The discharge module 60 may drive the actuator 54 formed in the plurality of cartridges 5 to discharge the dyeing material accommodated in the plurality of cartridges 5.

The discharge module 60 may include an elevating motor 61 and an elevating body 62 that is moved up or moved down by driving the elevating motor 61.

A driving force transferring member 63 for transmitting the driving force to the elevating body 62 may be formed in the elevating motor 61. The elevating body 62 may be moved up or moved down by receiving the driving force from the elevating motor 61.

The elevating body 62 may be moved up or down to selectively drive the actuator 54. When the elevating body 62 ascends, any one cartridge 5 may be pressurized, and when it descends, it may be separated from the cartridge 5 being pressurized.

Referring to FIG. 6, the elevating body 62 may include a coupling body 64 in which a through hole h4 through which a coupling member C connecting with the elevating motor 61 passes is formed, a pressing body 65 applying pressure to the actuator 54 formed in the cartridge 5, and a connecting body 66 connecting the coupling body 64 and the pressing body 65.

The coupling body 54 may receive the driving force from the elevating motor 61. When the pressing body 65 ascends, it may be in contact with the actuator 54, in particular the operating body 52, to apply pressure.

At least one bend may be formed in the connecting body 66. Bends 66*a*, 66*b*, and 66*c* may be formed so that a direction in which the dyeing material is discharged from the cartridge 5 does not intersect with the pressing body 65. The bends 66*a*, 66*b*, and 66*c* may be formed in a shape bent at a predetermined angle or more. A number and a shape of the bends 66*a*, 66*b*, and 66*c* are not limited to an example shown in FIG. 6.

As described above, when the bends 66*a*, 66*b*, and 66*c* are formed in the connecting body 66, there is an advantage that a possibility of the dyeing material being accommodated in the basket 7 is increased by minimizing a case in which the dyeing material discharged from the actuator 54 is adhered or bounces to the elevating body 62 rather than the case in which the bends 66, 66*b*, and 66*c* are not formed in the connecting body 66.

FIGS. 7*a* and 7*b* are views showing discharging of a dyeing material in a cartridge according to an embodiment of the present invention.

A cartridge 5 may include a container 51 storing a dyeing material and an actuator 54 discharging the dyeing material stored in the container 51 to the outside.

The actuator 54 may include a discharging body 53 in which an exit P from which the dyeing material stored in the container 51 is discharged is formed, and an operating body 52 that opens the exit P according to pressure. The exit P may be a path through which the dyeing material stored in the container 51 is moved out.

As shown in FIG. 7*a*, the exit P may be closed in a state in which an elevating body 62, in particular a pressing body 65, is separated from the operating body 52, and in this case, the dyeing material may not be discharged from the container 51.

Meanwhile, as shown in FIG. 7*b*, when the elevating body 62 rises and the pressing body 65 contacts the operating body 52 and pressure is applied, the exit P may be opened. In particular, as the pressure applied to the operating body 52 by the pressing body 65 increases, an area in which the exit P is opened may be wider. That is, as the pressure applied to the operating body 52 by the pressing body 65 is greater, an amount of dyeing material 8 discharged from the exit P is increased, and as the pressure applied to the operating body 52 by the pressing body 65 is smaller, the amount of the dyeing material 8 discharged from the exit P is decreased.

As described above, in the dispenser 1 according to an embodiment of the present invention, the pressing body 65 may press the operating body 52 to discharge the dyeing material 8. In this case, the dyeing material may include all of a liquid type, a cream type, oil type, or the like. That is, the dispenser 1 may discharge the liquid type dyeing material, the cream type dyeing material, or the oil type dyeing material accommodated in the cartridge 5. As described above, the dispenser according to the embodiment of the present invention has an advantage that the dyeing material may be discharged regardless of an ingredient state of the dyeing material.

A controller 110 may control at least one of a rise height, a rise speed, and an elevation time of the pressing body 65 according to the discharge amount.

For example, when the discharge amount according to the hair dye manufacturing method is a first weight, the controller 110 may elevate the pressing body 65 to a first height. When the discharge amount according to the hair dye manufacturing method is a second weight that is greater than the first weight, the controller 110 may elevate the pressing body 65 to a second height higher than the first height.

In detail, a control method when the controller 110 performs a dyeing material discharge mode will be described.

The dispenser 1 may perform the dyeing material discharge mode by receiving a hair dye manufacturing command. For example, the dispenser 1 may perform the dyeing material discharge mode by receiving a confirm icon 613 (see FIG. 17).

The controller 110 may control the main motor 30 so that any one cartridge 5 moves to the discharging area after starting the dyeing material discharge mode.

When initializing the dispenser 1, the controller 110 may set to receive an input of a number of rotation steps for moving to the discharging area for each cartridge 5. The controller 110 may move a specific cartridge 5 to the discharging area according to the set number of rotation steps.

The controller 110 may move any one of the cartridges 5 to the discharging area according to the hair dye manufacturing method, and then may stop the main motor 30.

The controller 110 may drive the elevating motor 61 so as to discharge the dyeing material accommodated in the cartridge 5 located in the discharging area by a target discharge weight.

FIG. 7*c* is a flowchart showing a method of controlling a discharge amount of a dyeing material according to an embodiment of the present invention.

The controller 110 may move up the elevating body 62 to a reference height while the main motor 30 is stopped (S101).

An initial height described later may be a height of the elevating body 62 immediately after the dyeing material discharge mode is performed.

The reference height may be a height that moves up the elevating body 62 higher than the initial height so that the pressing body 65 is adjacent to the operating body 52. The reference height may be a height that separates the pressing body 65 from the operating body 52 by a set distance.

When the elevating body 62 is moved up to the reference height, the pressing body 65 may not contact the operating body 52. For example, when the elevating body 62 is moved up to the reference height, a separation distance between the pressing body 65 and the operating body 52 may be 0.5 mm.

In the controller 110, when moving up the elevating body 62 by a set height from when the elevating body 62 is located at the initial height, it may take a long time for the pressing body 65 to contact the operating body 52. Therefore, the controller 110 moves up the elevating body 62 to the reference height, thereby reducing a time required for the hair dye discharge.

The controller 110 may move up the elevating body 62 by the set height for each setting period in a state in which the elevating body 62 is moved up to the reference height (S103).

When the elevating body 62 moves up to an excessively high height when it moves up one time, the controller 110 may gradually move up the elevating body 62 at predetermined intervals to minimize excessive discharge of the dyeing material in the cartridge 5.

For example, the setting period may be 200 ms, and the setting height may be 0.2 mm.

The controller 110 may sense a weight change for each set period of the elevating body 62 (S105).

The controller 110 may sense the weight change every time the elevating body 62 is moved up.

The controller 110 may receive a sensed weight from a weight sensor 104 to determine whether the weight change has occurred.

The controller 110 may continuously move up the elevating body 62 by the set height for each set period when the weight change is not detected.

Meanwhile, when the weight change is detected, the controller 110 may determine whether a weight change amount is equal to or greater than a reference value (S107).

The controller 110 may calculate the weight change amount through a difference between the sensed weights before and after the elevating body 62 moves up by the set height.

The reference value may be a predetermined value to determine whether the pressing body 65 and the operating body 52 are in contact with each other. For example, the reference value may be 0.06 g.

When the weight change is less than the reference value, the controller 110 may move up the elevating body 62 by a set height (S109).

When the weight change is less than the reference value, the controller 110 may move up once the elevating body 62 by the set height. Here, the set height may be equal to or smaller than the set height in step S103.

The controller 110 may move up the elevating body 62 by the set height and then maintain the rise height of the elevating body 62 for a predetermined time (S111).

Here, the rise height may refer to a current height after the elevating body 62 is moved up by the set height. That is, the rise height may refer to a height after being moved up in step S109. For example, the predetermined time may be 1 s.

When the dyeing material is discharged from the cartridge 5, the dyeing material may fall immediately and may fall after being dripped at the exit P of the cartridge 5. When falling after being dripped for the predetermined time at the exit P of the cartridge 5, since it is difficult for the weight sensor 104 to sense the weight change immediately, after the rise height of the elevating body 62 is maintained for the predetermined time, it may be determined again whether the weight change amount is equal to or more than the reference value.

In this case, it is possible to determine more accurately the weight change amount, thereby improving the reliability.

The controller 110 may determine whether a target discharge weight is equal to or greater than a reference weight when the weight change amount is equal to or greater than the reference value (S113).

Here, the target discharge weight may refer to a total weight of the dyeing material to be discharged from the cartridge 5 located in the discharging area. That is, the target discharge weight may be the total weight of the dyeing material to be discharged from one cartridge 5 located in the discharging area, which is different from the total weight of the dyeing material to be manufactured.

The reference weight may be a weight serving as a reference for determining whether or not a high-speed discharge operation is performed. The controller 110 may perform the high-speed discharge operation according to the target discharge weight, or may not perform the high-speed discharge operation. In detail, when the amount of dyeing material to be discharged is large, high-speed discharge operation may be performed to reduce the time required for discharging the dyeing material.

The reference weight may be input and set in advance. For example, the reference weight may be 10 g, and the controller 110 may perform the high-speed discharge operation when the target discharge weight is 20 g, and may perform the high-speed discharge operation when the target discharge weight is 8 g.

The high-speed discharge operation may be an operation for maintaining the rise height of the elevating body 62.

The controller 110 may maintain the rise height of the elevating body 62 until the sensed weight of the weight sensor is a first set weight, when the target discharge weight is equal to or greater than the reference weight (S115).

The controller 110 may maintain the rise height of the elevating body 62, thereby continuously discharging the dyeing material from the cartridge 5.

The controller 110 may calculate the first set weight according to the target discharge weight.

The controller 110 may set a weight obtained by subtracting a set value from the target discharge weight to the first set weight. For example, when the target discharge weight is 20 g and the set value is 2 g, the controller 110 sets the first set weight to 18 g, and may maintain the rise height of the elevating body 62 until the sensed weight of the weight sensor 104 reaches 18 g.

The set value may be a fixed value.

Alternatively, the set value may be a value set differently according to the target discharge weight. For example, the controller 110 may set the set value to a weight corresponding to 10% of the target discharge weight.

The controller 110 maintains the rise height of the elevating body 62 until the sensed weight of the weight sensor reaches the first set weight, and then may move down the elevating body 62 once by a set height (S119).

When the target discharge weight is less than the reference weight in step S113, the controller 110 may immediately move down the elevating body 62 once by the set height without performing the high-speed discharge operation (S119).

Here, the set height may be equal to or lower than the set height in step S103.

When the controller 110 has moved down the elevating body 62 by the set height, the pressing body 65 may be separated from the operating body 52 or may apply continuously a pressure to the operating body 52. When the controller 110 has moved down the elevating body 62 by the set height, the same amount of dyeing material may be continuously discharged from the cartridge 5, the discharge amount of the dyeing material may decrease, or the discharge of the dyeing material may be stopped.

The controller 110 may determine whether the sensed weight of the weight sensor 104 reaches a second set weight (S121).

The controller 110 may calculate the second set weight according to the target discharge weight.

The second set weight may be greater than the first set weight.

According to the embodiment, the controller 110 may calculate a pre-set ratio of the target discharge weight as the second set weight. For example, the set ratio may be 96%. The controller 110 may calculate 96% of the target discharge weight as the second set weight.

When the sensed weight of the weight sensor 104 does not reach the second set weight, the controller 110 may move down the elevating body 62 once again by the set height.

As described above, the discharging weight of the dyeing material may be finely adjusted by moving down the elevating body 62 stepwise without moving down the elevating body 62 at once.

Meanwhile, when the sensed weight of the weight sensor 104 reaches the second set weight, the controller 110 may move down the elevating body 62 to the initial height (S123).

Alternatively, when the sensed weight of the weight sensor 104 reaches the second set weight, the controller 110 may move down the elevating body 62 to a height at which the pressing body 65 is spaced apart from the operating body 52.

Even after the elevating body 62 is moved down to the height at which the pressing body 65 is spaced apart from the operating body 52, since the dyeing material dripped at the exit P of the cartridge 5 may be accommodated in the basket 7, the controller 110 may move down the elevating body 62 when the sensed weight of the weight sensor 104 reaches the second set weight that is less than the target discharge weight, not the target discharge weight.

The controller 110 may determine whether the sensed weight of the weight sensor 104 is within an error range of the target discharge weight (S125).

The error range may be set in advance. The error range may be a range in which an error rate is added or subtracted based on the target discharge weight. That is, the error range may be from 'target discharge weight−error rate' to 'target discharge weight+error rate'. For example, the error rate may be 3%.

Meanwhile, a value obtained by subtracting the error rate from 100 may be higher than the set ratio at a time of calculating the second set weight in step S121.

The controller 110 may determine whether the sensed weight detected by the weight sensor 104 is greater than the target discharge weight when the sensed weight of the weight sensor 104 is out of the error range of the target discharge weight (S127).

The controller 110 may correct the discharge weight of another dyeing material when the sensed weight of the weight sensor 104 is greater than the target discharge weight (S129).

In detail, when the sensed weight of the weight sensor 104 is greater than the target discharge weight, the controller 110 may increase the discharge amount of the other dyeing material to be included in the hair dye more than the calculated discharge amount. For example, when 15 g of a first dyeing material is discharged after calculating the hair dye manufacturing method in which 10 g of the first dyeing material and 20 g of a second dyeing material are mixed, the controller 110 may correct the discharge weight of the second dyeing material from 20 g to 30 g.

That is, when the sensed weight of the weight sensor 104 is larger than the target discharge weight, the controller 110 may correct the discharge weight of the other dyeing material based on a hair dye manufacturing ratio according the initially calculated dye manufacturing method.

Meanwhile, the controller 110 may control the elevating body 62 by a fine discharge mode when the sensed weight of the weight sensor 104 is out of the error range of the target discharging weight and the sensed weight of the weight sensor 104 is less than the target discharging weight.

Here, the fine discharge mode is a mode in which the elevating body 62 is moved up and then moved down, and may be a mode in which the pressing body 65 is brought into contact with the operating body 52 within a predetermined time, and then the elevating body 62 is moved up and down so as to be separated. Accordingly, in the fine discharge mode, the pressing body 65 applies an instantaneous pressure to the operating body 52, so that the dyeing material accommodated in the cartridge 5 may be discharged. An amount of dyeing material discharged from the cartridge 5 in the fine discharge mode may be smaller than that of dyeing material discharged when the pressing body 65 applies continuously the pressure to the operating body 52.

The controller 110 may control the elevating body 62 in the fine discharge mode and then determine again whether the sensed weight of the weight sensor 104 is within the error range of the target discharging weight (S125).

The controller 110 may terminate the dyeing material discharge mode in the cartridge located in the present discharging area when the sensed weight of the weight sensor 104 is within the error range of the target discharge weight.

The cartridge 5 may be a Bag on valve (BOV) in which the container 51 is shut off from the outside. Accordingly, it is possible to minimize a case in which the dyeing material stored in the container 51 is in contact with the outside air, and to minimize the possibility of oxidation of the dyeing material, and thus there is an advantage that an expiration date of the dyeing material may be maximized.

FIG. 8 is a control block diagram of a terminal according to an embodiment of the present invention.

A terminal 2 may include at least some or all of an input interface 201, a camera 202, a display 203, a communicator 204, a memory 205, and a controller 210.

The terminal 2 may be a smart phone, but it is merely illustrative, and may include a wearable device such as a smart watch, a tablet PC, a laptop, a desktop, and the like.

The input interface 201 may receive an input command from a user. The input command may include at least one piece of information. For example, the input interface 201 may receive an input command for selecting a target color to be dyed. Alternatively, the input interface 201 may receive a command for selecting a hair length. However, it is merely illustrative, and the input interface 201 may receive an input command including various information such as a latest dyeing time of the user, a current state of the hair, and the like.

The input interface 201 may be formed of a touch screen or the like, or may include a physical key button.

The camera 202 may photograph the user. The camera 202 may photograph a facial image of the user so that the user's head is included.

The facial image photographed by the camera 202 may be used in a hair dyeing simulation described later.

The facial image photographed by the camera 202 may also be used to determine a current color of the user's hair. For example, an accuracy of measurement may be calculated by comparing the current color of the hair measured by a sensor 3.

The display 203 may display various information related to hair dye manufacture.

For example, the display 203 may display at least one sample color so as to display a target color, display a recommended color, or display ingredient information of a hair dye to be manufactured, price information of the hair dye to be manufactured, and a hair dyeing simulation image.

The communicator 204 may transmit and receive signals of at least one of the sensor 3 and the dispenser 1.

In addition, when a separate server storing a database related to the hair dye is provided, the communicator 204 may transmit and receive signals with the server.

The communicator 204 may transmit information acquired via the input interface 201, the camera 202, and the like, information stored in the memory 205, and the like to the outside. In addition, the communicator 204 may receive various information from the outside. For example, the communicator 204 may receive information related to the hair dye to be manufactured from the dispenser 1.

The memory 205 may store various information related to the user, the hair dye, and the like. For example, the memory 205 may store a hair dye usage history of the user. Alternatively, the memory 205 may store information on the ingredients of the hair dye, and the like.

Here, the hair dye usage history may include a hair color before dyeing, a target hair color, ingredient information of a used hair dye (e.g., a type of dyeing material and a weight of dyeing material), a hair color after dyeing, an accuracy of color development, hair condition information, and the like.

Here, the accuracy of color development is an index showing the accuracy of the hair dyed hair color versus the target color, and may show a coincidence between the target color and the hair dyed hair color. The hair condition information may include a degree of hair damage, dryness, and the like.

When the memory 205 stores the hair dye usage history, the memory 205 may store the hair dye usage history separately for each customer or designer.

The memory 205 may store the hair dye usage history for each customer. Here, the customer may refer to the user targeted for use of the hair dye. That is, the customer may refer to the user dyed the hair or the like with the hair dye. The memory 205 may store the hair dye usage history for a first customer, the hair dye usage history for a second customer, . . . , and the hair dye usage history for an Nth customer.

The memory 205 may store the hair dye usage history for each designer. Here, the designer may refer to the user who have performed hair dyeing using the hair dye. That is, the designer may refer to the user who have dyed other people's hair, or the like using the hair dye. The memory 205 may store the hair dye usage history for a first designer, the hair dye usage history for a second designer, . . . , and the hair dye usage history for an Nth designer.

As described above, when the hair dye usage history is stored for each designer, there is an advantage that it is easy to calculate an amount of the hair dye usage for each designer. For example, when several designers use the dispenser 1 together, it is possible to calculate an amount of the hair dye used by each designer, a price of the hair dye, etc. based on the hair dye usage history stored for each designer. When an amount of the hair dye used by the first designer is 1 kg and an amount of the hair dye used by the second designer is 2 kg during the same period, the first designer and the second designer may share the hair dye cost by 1:2.

The hair dye usage history may be stored in at least one of the terminal 2 and the dispenser 1.

The controller 210 may control the overall operation of the terminal 2. The controller 210 may control at least one of the input interface 201, the camera 202, the display 203, the communicator 204, and the memory 205.

Next, FIG. 9 is a control block diagram of a dispenser according to an embodiment of the present invention.

A dispenser 1 may include at least some or all of an input interface 101, a memory 102, a display 6, a communicator 103, a main motor 30, an elevating motor 61, a weight sensor 104, and a controller 110.

The input interface 101 may receive various input commands related to hair dye manufacture. For example, the input interface 101 may receive at least one of an input command for initializing the dispenser 1, an input command for manually setting the hair dye to be manufactured, an input command for checking/replacing a remaining amount of a cartridge, an input command for checking a weight of the hair dye, and an input command for checking a user history. However, it is merely illustrative, and the input interface 101 may receive the various input commands related to hair dye manufacture.

In addition, the input interface 101 may receive an input command for selecting a target color to be dyed, and the like. That is, the input interface 101 of the dispenser 1 may receive an input command received through an input interface 201 provided in a terminal 2. On the contrary, the input interface 201 of the terminal 2 may receive an input command received through the input interface 101 provided in the dispenser 1.

The input interface mentioned below may refer to at least one of the input interface 101 of the dispenser 1 and the input interface 201 of the terminal 2.

The memory 102 may store various information related to hair dye manufacture.

Specifically, the memory 102 may store a hair dye manufacturing database.

Here, the hair dye manufacturing database may refer to a hair dye manufacturing algorithm that calculates a component ratio of a dyeing material for dyeing a current color of hair to a target color, a hair dye manufacturing formula, and the like.

A hair dye manufacturing method may be calculated based on the hair dye manufacturing database, and the hair dye manufacturing method may include kind and weight information of the dyeing material discharged from the plurality of cartridges 5 mounted on the dispenser 1.

The controller 110 may calculate the hair dye manufacturing method based on the hair dye manufacturing database. The controller 110 may calculate the hair dye manufacturing method including a kind of the dyeing material to be included in the hair dye for dyeing the hair from the current color to the target color, composition ratios of dyeing materials when the kind of the dyeing material is in plural, weight information of total hair dye, and the like based on the hair dye manufacturing database. The controller 110 may acquire the kind of the dyeing material and the composition ratios of the dyeing materials through the hair dye manufacturing algorithm or the hair dye manufacturing formula. The controller 110 may acquire the weight information of the total hair dye based on a hair length of the user input through the input interface.

The display 6 may display various information related to hair dye manufacturing such as a status of the dispenser 1, a status of the cartridge 5, hair dye information, and the like.

The communicator 103 may transmit and receive signals with at least one of the sensor 3 and the terminal 2. For example, the communicator 103 may receive the current color information of the hair from the sensor 3 and receive the target color information to be dyed from the terminal 2. In addition, the communicator 103 may transmit, to the terminal 2, the information of hair dye which may be manufactured based on the dyeing material mounted on the dispenser 1, and the terminal 2 may display a hair dyeing simulation.

The main motor 30 may rotate the main body 20 on which the plurality of cartridges 5 are mounted. The main motor 30 may rotate the main body 20 so that the cartridge containing the discharged dyeing material is located in a discharging area.

The controller 110 may control the main motor 30 so that the cartridge containing the discharged dyeing material is located in the discharging area according to the hair dye manufacturing method, and may control the elevating motor 61 so as to discharge a predetermined amount of the dyeing material, which is defined in the hair dye manufacturing method, from the cartridge located in the discharging area.

The controller 110 may control the main motor 30 so that each of the plurality of cartridges is sequentially located in the discharging area when the dyeing material to be discharged is in plural.

The elevating motor 61 may elevate the elevating body 62 so as to discharge the dyeing material from the cartridge located in the discharging area. When the elevating body 62 elevates, the elevating body 62 may press the actuator 54 of the cartridge 5 located in the discharging area, and thus the dyeing material contained in the cartridge 5 may be discharged. When the elevating body 62 moves down, the pressure applied to the actuator 54 by the elevating body 62 is decreased, and the amount of the dyeing material discharged from the cartridge 5 is reduced. When the elevating body 62 is spaced apart from the actuator 54, the discharging of the dyeing material may be stopped.

The controller 110 may control the elevating motor 61 according to the weight information included in the hair dye manufacturing method. For example, when the hair dye manufacturing method includes information for mixing a first dyeing material 10*g* contained in a first cartridge and a second dyeing material 10*g* contained in a second cartridge, the controller 110 may control the elevating motor 61 so as to discharge 10 g of the first dyeing material after locating the first cartridge in the discharging area through the main motor 30, and may control the elevating motor 61 so as to discharge 10 g of the second dyeing material after locating the second cartridge in the discharging area.

The controller 110 may calculate the amount of dyeing material discharged from the discharging area through the weight sensor 104. The weight sensor 104 may be provided in the accommodating body 40. For example, the weight sensor 104 may be located inside the accommodating body 40.

The weight sensor 104 may measure a weight of a basket 7 placed in the accommodating body 40. The basket 7 may contain the dyeing material discharged from the cartridge 5. The controller 110 may calculate the weight of the dyeing material discharged from each cartridge 5 based on a change in weight caused by the discharge of the dyeing material. For example, when the weight measured by the weight sensor 104 before the dyeing material is discharged is A g, the weight measured by the weight sensor 104 after the first dyeing material is discharged is B g, and the weight measured by the weight sensor 104 after the second dyeing material is discharged is C g, the controller 110 may calculate the weight of the basket 7 as A g, the weight of the discharged first dyeing material may be calculated by a calculation of B-A g, and the weight of the discharged second dyeing material may be calculated by a calculation of C-B-A g.

The controller 110 may control the overall operation of the dispenser 1. The controller 110 may control at least some or all of the input interface 101, the memory 102, the display 6, the communicator 103, the main motor 30, the elevating motor 61, the weight sensor 104, and the controller 110.

According to one embodiment, the controller 110 may receive the current color information of the hair from the sensor 3, receive the target color information from the terminal 2, calculate the hair dye manufacturing method for dyeing the hair from the current color to the target color, and discharge the dyeing material contained in the plurality of cartridges 5 according to the calculated hair dye manufacturing method to provide the hair dye.

The controller 110 may calculate the hair dye manufacturing method in which the first dyeing material and the second dyeing material are mixed at A:B when the current color of the hair is the first color and the target color is the second color. The controller 110 may calculate the hair dye manufacturing method in which the first dyeing material and the third dyeing material are mixed at C:D when the current color of the hair is the first color and the target color is the third color. The controller 110 may calculate the hair dye manufacturing method in which the second dyeing material, the fourth dyeing material, and the fifth dyeing material are mixed at E:F:G when the current color of the hair is the fourth color and the target color is the second color. That is, the kind and weight of the dyeing material used in the manufacture of the hair dye may be different depending on the current color and target color of the hair. The kind of dyeing material used in the manufacture of the hair dye may be various, and only one dyeing material may be used or two or more dyeing materials may be used.

According to a first embodiment, the total amount of the dyeing material to be discharged may be predetermined. In this case, the controller 110 may calculate the amount of the dyeing material discharged according to the composition ratio based on the predetermined total amount. For example, when the total amount of the hair dye is set to 100 g, and the hair dye manufacturing method of mixing the first dyeing material and the second dyeing material at 4:6 is calculated, the controller 110 may control such that 40 g of the first dyeing material and 60 g of the second dyeing material are discharged.

According to a second embodiment, the total amount of the dyeing material discharged may vary according to the length of the hair of the user. In this case, the controller 110 may calculate the total amount of the dyeing material discharged based on the user's hair length, and calculate the amount of each dyeing material to be discharged according to the mixing ratio of the dyeing materials based on the calculated total amount. For example, assuming that the hair dye manufacturing method of mixing the first dyeing material and the second dyeing material at 1:4 is calculated, when the hair length of the user is a short hair length, the controller 110 calculates the total amount of the dyeing material to be 50 g, and may control such that 10 g of the first dyeing material and 40 g of the second dyeing material are discharged. When the hair length of the user is a shoulder length, the controller 110 calculates the total amount of the dyeing material to be 100 g, and may control such that 20 g of the first dyeing material and 80 g of the second dyeing material are discharged.

The user's hair length may be input via the input interface. The input interface may receive the user's hair length as a numerical value. For example, the input interface may receive the user's hair length as a numerical value such as 5 cm, 10 cm, and so on. Alternatively, the input interface may receive the user's hair length as a hair-down location such as under the ear, shoulder, chest, waist, or the like.

In addition, the dispenser 1 may further include a camera module (not shown). The camera module may photograph a progress of dyeing to output it to the display 6.

According to the embodiment, the camera module may be a microscope camera. The microscope camera may photograph at approximately 20 to 500 times magnification. In this case, it is possible to provide the user with an image in which a scalp condition and a hair condition are photographed more clearly.

The camera module may include a bayer filter. The bayer filter divides each of signals received via an image sensor into R, G, and B channels, and synthesizes the three channels by an additive mixing method to generate a color image. In this case, it is possible to more clearly provide the user with a change in hair color according to the hair dyeing progress.

The camera module may be integrally formed with the dispenser 1. Alternatively, the camera module 1 may be provided separately from the dispenser 1, and the camera module 1 may be connected to the dispenser 1 by wire or wirelessly.

FIG. 10 is a flowchart showing a method of operating a hair dye providing system according to an embodiment of the present invention.

A sensor 3 may measure a current color of hair (S11), and may transmit current color information to a dispenser 1 (S13).

The current color information may include at least one of a color name, a color code, and a color image.

The sensor 3 may transmit the current color information of the hair to a device that calculates a hair dye manufacturing method. That is, in a case shown in FIG. 10, the dispenser 1 calculates the hair dye manufacturing method, and the sensor 3 transmits the current color information to the dispenser 1. Unlike the case shown in FIG. 10, when a terminal 2 calculates the hair dye manufacturing method, the sensor 3 may transmit the current color information to the terminal 2.

According to the embodiment, a step of measuring the current color of the hair may be omitted, and in this case, the hair dye manufacturing method may be calculated based only on a target color. There is an advantage that the color of hair dyed with the hair dye manufactured reflecting the current color of hair is closer to the target color than the color of hair dyed without reflecting the current color of the hair. This is because the hair color is slightly different for each user, so even though the target color is the same, the hair dye may be different for each user, and it is possible to manufacture a hair dye suitable for the target color when reflecting the current color of the hair as in one embodiment of the present invention.

In addition, the sensor 3 may determine whether hair condition information is measured or not (S15).

Here, the hair condition information may refer to information related to a current condition of the hair, which may affect a result of the hair dyeing. For example, the hair condition information may include a hair thickness, a degree of hair dryness, a degree of hair damage, and the like.

When the sensor 3 measures the hair condition information, the hair condition information may be transmitted to the dispenser 1 (S17).

As described above, when the terminal 2 calculates the hair dye manufacturing method, the sensor 3 may transmit the hair condition information to the terminal 2.

The terminal 2 may display a sample color (S19).

The sample color may be a preview color that predicts and displays the color of hair after dyeing. The terminal 2 may display a plurality of sample colors.

The terminal 2 may determine whether a selection command of a target color is received (S21), and when the target color is selected, may transmit the target color information to the dispenser 1 (S23).

The terminal 2 may continue to display the sample color when the target color selection command is not received. According to the embodiment, the terminal 2 may change the displayed sample color when the target color is not selected for more than a predetermined time. That is, the terminal 2 displays first to sixth sample colors, and then may display seventh to twelfth sample colors instead of the first to sixth sample colors when the target color is not selected for more than the predetermined time.

Meanwhile, the terminal 2 is not limited to display a plurality of sample colors, the display 6 of the dispenser 1 may display the plurality of sample colors, and the input interface 101 of the dispenser 1 may receive a target color selecting command for selecting one of the plurality of sample colors.

FIG. 11 is an illustrative view showing a method of displaying a sample color according to a first embodiment of the present invention, and FIG. 12 is an illustrative view showing a method of displaying a sample color according to a second embodiment of the present invention.

As shown in FIG. 11, according to the first embodiment of the present invention, the display 203 of the terminal 2 may display at least one sample color 1121 to 1126 together with a current color 1110. The current color 1110 represents a current color of a user's hair measured via the sensor 3, and the sample colors 1121 to 1126 represent a color of hair predicted to be developed when dyeing with a hair dye to be manufactured, and may be an image showing the color preview after dyeing.

The user may select any one of the at least one sample color 1121 to 1126 as a target color by referring to the current color 1110 and the sample colors 1121 to 1126. The target color may be the hair color that the user has requested the hair dye manufacture.

The display 203 of the terminal 2 may further display a manufacture request icon 1131 and a cancel icon 1132. The controller 210 may receive a command for selecting the target color when receiving the command to select the manufacture request icon 1131 after selecting at least one sample color 1121 to 1126. Here, the target color may be any one color selected from among the at least one sample color 1121 to 1126.

Meanwhile, as shown in FIG. 12, according to the second embodiment of the present invention, the display 203 of the terminal 2 may further display at least one recommended color 1211 and 1212. Two recommended colors 1211 and 1212 are displayed in FIG. 12, but a number of recommended colors is not limited.

At least one of the recommended colors 1211 and 1212 may be a color that may be manufactured based on a kind of a dyeing material contained in a plurality of cartridges 5 and a remaining amount of the dyeing material. The color of the hair dye capable of being manufactured may vary depending on the kind of the dyeing material contained in the plurality of cartridges 5. For example, a dyeing material G is required to manufacture a green hair dye, but the cartridge 5 containing the dyeing material G may not be mounted in the dispenser 1. Alternatively, even though the cartridge 5 in which the dyeing material G is contained is mounted in the dispenser 1, a remaining amount may be insufficient to manufacture the hair dye. Accordingly, there is an advantage that reliability of a product may be improved by displaying the recommended color based on the kind of the dyeing material and the remaining amount of the dyeing material.

Alternatively, at least one of the recommended colors 1211 and 1212 may be a color calculated to minimize hair damage. For example, a color of the hair dye that is predicted to minimize hair damage during dyeing among the hair dyes capable of being manufactured with the dyeing material contained in the plurality of cartridges 5 mounted in the dispenser 1 may be recommended. In another example, the color of the hair dye, which is predicted to minimize hair damage during dyeing may be recommended based on the dryness of the user's hair, the degree of damage to the hair, etc.

Alternatively, at least one of the recommended colors 1211 and 1212 may be a color calculated to be developable based on a hair condition measured by the sensor 3. Specifically, even though a color to be dyed is the same, a degree of color development may differ depending on the current color of the user's hair. For example, when the color to be dyed is yellow, the degree of color development when the current color of the user's hair is brown may be higher than that of a case in which the current color of the user's hair is black. That is, when the current color of the user's hair is brown, it may be dyed yellow better than when it is black. Accordingly, the recommended color may be a color that is predicted to be well developed based on the current color of the user's hair. Accordingly, the user's satisfaction may be enhanced when dyeing with the hair dye manufactured in the dispenser 1.

In addition, the recommended color may be more varied.

FIG. 10 will be described again.

When the dispenser 1 receives the target color information from the terminal 2, it is possible to calculate the hair dye manufacturing method for dyeing hair from the current color to the target color (S25).

According to the first embodiment, the controller 110 may calculate the hair dye manufacturing method for dyeing the current color of the hair to the target color based on a hair dye manufacturing database. That is, the controller 110 may include at least one cartridge 5 containing the dyeing material to be discharged, and dyeing material weight information to be discharged from each of the cartridges, in order to manufacture a hair dye for dyeing the current color of the hair to the target color.

According to the second embodiment, the controller 110 may calculate the hair dye manufacturing method for dyeing the current color of the hair to the target color based on at least one of a degree of damage of the hair and a degree of dryness of the hair. Specifically, the sensor 3 may measure the current color of the hair and the hair condition information such as the degree of damage of the hair and the degree of dryness of the hair. For example, the controller 110 may calculate a hair dye manufacturing method in which a specific dyeing material is included at less than a predetermined reference value when the degree of damage of the hair is higher than a predetermined reference value. Here, the specific dyeing material may be a predetermined dyeing material having a high degree of hair damage, for example, an oxidizing agent, and the like. In another example, the controller 110 may calculate a hair dye manufacturing method in which a specific dyeing material is included at a predetermined reference value or more when a dryness degree of hair is less than a predetermined reference value. Here, the specific dyeing material may be a dyeing material such as a nutrient that provides moisture and shine to the hair. As described above, when the hair dye manufacturing method is calculated in consideration of the user's hair condition, there is an advantage that it is possible to manufacture a suitable hair dye of the user's hair, such as protecting the user's hair.

According to the third embodiment, the controller 110 calculates the hair dye manufacturing method for dyeing the current color of the hair to the target color based on the hair dye manufacturing database, and then may correct the hair dye manufacturing method calculated based on a hair dye usage history.

Specifically, first, the controller 110 may calculate the hair dye manufacturing method for dyeing the current color of the hair to the target color based on the hair dye manufacturing database. The controller 110 may check whether a hair dye usage history is stored after calculating the hair dye manufacturing method. That is, after calculating the hair dye manufacturing method, the controller 110 may determine the presence or absence of a previously stored hair dye usage history for the user who has requested the hair dye. The controller 110 may control so as to manufacture the hair dye according to the calculated hair dye manufacturing method when the previously stored hair dye usage history is not present. Alternatively, the controller 110 may correct the calculated hair dye manufacturing method when the previously stored hair dye usage history is present.

A correcting method may be as follows. For example, the controller 110 may acquire the current color and the target color of the hair requested to manufacture the hair dye, and may detect a past dyeing history composed of a color closest to the current color and the target color acquired from the hair dye usage history. The controller 110 may compare a hair dye ingredient according to the past dyeing history and the hair dye ingredient calculated according to the manufacturing request when the color development accuracy included in the past dyeing history is equal to or more than a predetermined reference value. The controller 110 may correct the hair dye ingredient calculated according to the manufacturing request so as to be similar to the hair dye ingredient according to the past dyeing history. Alternatively, when the accuracy of color development included in the past dyeing history is less than the predetermined reference value, the controller 110 may compare the hair dye ingredient according to the past dyeing history and the hair dye ingredient calculated according to the manufacturing request. The controller 110 may correct the hair dye manufacturing method such that the hair dye ingredient calculated according to the manufacturing request is different from the hair dye ingredient according to the past dyeing history.

The controller 110 may correct the hair dye manufacturing method by modifying the ingredient of the dyeing material or by adjusting a discharge amount of the dyeing material. Accordingly, there is an advantage that the hair dye may be manufactured according to hair characteristics of an individual user.

The above-described embodiments may be respectively implemented, or two or more embodiments may be implemented in combination.

The communicator 103 of the dispenser 1 may transmit the hair dye manufacturing information to the terminal 2 (S27) and the terminal 2 may display the hair dye manufacturing information (S29).

The hair dye manufacturing information may be hair dye information according to the hair dye manufacturing method calculated in step S25. The dispenser 1 may guide the hair dye information to the user by transferring the hair dye manufacturing method to the terminal 2 before manufacturing the hair dye after calculating the hair dye manufacturing method.

According to the embodiment, step S25 and step S29, and step S31 and step S32 described later may be omitted. That is, the dispenser 1 may manufacture the hair dye by discharging the dyeing material contained in the plurality of cartridges 5 according to the calculated manufacturing method right after calculating the hair dye manufacturing method.

FIG. 13 is an illustrative view showing a method of displaying hair dye manufacturing information according to the first embodiment of the present invention, FIG. 14 is an illustrative view showing a method of displaying hair dye manufacturing information according to the second embodiment of the present invention, and FIG. 15 is an illustrative view showing a method of displaying hair dye manufacturing information according to a third embodiment of the present invention.

As shown in FIG. 13, a display 203 of a terminal 2 may display a current color 1311 of hair, a target color 1312, and ingredient information 1320 and 1330 of a hair dye when displaying hair dye manufacturing information. The current color 1311 of the hair is an image representing the current color of a user's hair measured via a sensor 3 and the target color 1312 may be an image representing a color selected by the user to be dyed. The hair dye ingredient information 1320 and 1330 may include a kind 1320 of a discharged dyeing material and an amount 1330 of a discharged dyeing material. That is, the hair dye ingredient information 1320 and 1330 may represent the kind 1320 of the dyeing material to be included in the hair dye to be manufactured and a weight of each dyeing material. The kind 1320 of the dyeing material may include at least one of a name of the dyeing material and a cartridge number.

According to the second embodiment, as shown in FIG. 14, the display 203 of the terminal 2 may further display price information 1410 of the hair dye together with the current color 1311 of the hair, the target color 1312, the hair dye ingredient information 1320 and 1330 when the hair dye manufacturing information is displayed. The current color 1311 of the hair, the target color 1312, and the hair dye ingredient information 1320 and 1330 are the same as those described in FIG. 13.

The price information 1410 of the hair dye may represent an estimated price of the hair dye to be manufactured. Even though the weight is the same, the price may be different depending on the kind of the dyeing material. Even though the kind of the dyeing material is the same, the price of the hair dye may be different depending on the discharged weight. For example, when manufacturing the same kind of hair dye, a hair dye weight to be manufactured for a first user whose hair length is a first length may be heavier than a hair dye weight to be manufactured for a second user whose hair length is a second length which is shorter than the first length. In this case, it may be preferable that the price of the hair dye to be manufactured for the first user is higher than that of the hair dye to be manufactured for the second user. The terminal 2 may display the price information 1410 of the hair dye to guide the hair dye price to the user before manufacturing the hair dye.

According to the third embodiment, as shown in FIG. 15, the display 203 of the terminal 2 may display a simulation image 1512 that predicts and shows a hair dyeing result. The controller 210 of the terminal 2 may generate and display an image for predicting the hair dyeing result based on at least one of the current color of the hair, the hair condition, and the hair dye usage history. The controller 210 of the terminal 2 may further display a pre-dyed image 1511 together with the simulation image 1512. Here, the pre-dyed image 1511 may be an image generated based on the current color measured by the sensor 3, or a user image measured by the camera 202. Thus, the user has an advantage of predicting the hair dye usage result through the simulation image 1512.

The method of displaying the hair dye manufacturing information according to the first to third embodiments of the present invention shown in FIGS. 13 to 15 may be implemented individually, or two or more embodiments may be combined and implemented. That is, for example, the terminal 2 may display the hair dye component information and the simulation at the same time when displaying the hair dye manufacturing information.

Meanwhile, a case in which the terminal 2 displays the hair dyeing simulation image may be more varied. That is, the controller 210 of the terminal 2 may display the hair dyeing simulation image not only when displaying the hair dye manufacturing information, but also when one of sample colors is selected. Specifically, as shown in FIGS. 11 to 12, the controller 210 may receive a command for selecting at least one of sample colors 1121 to 1126 and recommended colors 1211 and 1212 in a state in which they are displayed. In this case, the controller 210 may generate the hair dyeing simulation image in the selected color to display it as shown in FIG. 15. When a command for selecting a confirm icon 1341 is received in a state in which the simulation image 1512 is displayed, it is possible to transmit the target color information to the dispenser 1.

When the display 203 of the terminal 2 displays the hair dye manufacturing information, the confirm icon 1341 and a cancel icon 1342 may be further displayed as shown in FIGS. 13 to 15. When the controller 210 receives a command for selecting the confirm icon 1341, it may determine that a hair dye manufacturing command has been received. When the controller 210 receives a command for selecting the cancel icon 1342, it may determine that a hair dye manufacturing cancel command has been received.

The controller 210 of the terminal 2 may determine whether or not the hair dye manufacturing command is received (S29). When the controller 210 of the terminal 2 receives the hair dye manufacturing command, it transmits the hair dye manufacturing command to the dispenser 1 (S32), and when receiving the hair dye manufacturing cancel command, it may return to step S19 and display the sample color again.

The dispenser 1 may receive a hair dye manufacturing command from the terminal 2. When the dispenser 1 receives the hair dye manufacturing command from the terminal 2, it may manufacture the hair dye by discharging the dyeing material contained in the plurality of cartridges 5 according to the hair dye manufacturing method calculated in step S25.

FIG. 16 is one example of a screen displayed by a display of a dispenser according to an embodiment of the present invention.

As shown in FIG. 16, a display 6 of a dispenser 1 may display at least one of a working status list 610, an initialization icon 621, a manual setting icon 622, a remaining amount check/replace icon 623, a weight check icon 624, and a user history icon 625.

The working status list 610 may show information of a hair dye currently being manufactured or information of a hair dye to be manufactured.

FIG. 17 is an illustrative view showing a working status list according to an embodiment of the present invention.

As shown in FIG. 17, the display 6 may display a working status list 610. The working status list 610 may be a window informing a working status of the dispenser 1. The working status list 610 may include an item 614 showing the hair dye currently being manufactured or an item 615 showing the hair dye to be manufactured. In addition, the working status list 610 may include a delete icon 611, a cancel icon 612, and a confirm icon 613.

The delete icon 611 may be an icon deleting at least one of items included in the working status list 610. When the controller 110 receives a command for selecting the delete icon 611, it may delete hair dye manufacturing information corresponding to at least one item included in the working status list 610.

The cancel icon 612 may be an icon canceling at least one of items included in the working status list 610. When the controller 110 receives a command for selecting the cancel icon 612, it may cancel hair dye manufacture corresponding to at least one item included in the working status list 610. In this case, unlike the delete icon 611, the hair dye manufacturing information may be stored, and when the controller 110 receives a manufacturing command again, the canceled hair dye manufacture may be included as an item of the working status list 610 again.

The confirm icon 613 may be an icon performing hair dye manufacture according to at least one of items included in the working status list 610. When the controller 110 receives a command for selecting the confirm icon 613, it may control a main motor 30 and an elevating motor 61 so as to manufacture a hair dye corresponding to at least one item included in the working status list 610.

FIG. 16 will be described again.

The initialization icon 621 may receive a command for sorting a plurality of cartridges 5. When the dispenser 1 is booted with power supplied thereto, the controller 110 may arrange the plurality of cartridges 5 when receiving a command for selecting the initialization icon 621. The controller 110 may further display a pop-up window showing that alignment of the plurality of cartridges 5 is in progress, and may not display the pop-up window when completing alignment of the plurality of cartridges 5. The dispenser 1 may be ready for hair dye manufacture as the alignment of the cartridges 5 is completed.

The manual setting icon 622 may be an icon for arbitrarily setting the hair dye to be manufactured. That is, when the controller 110 receives the manual setting icon 622, it may receive a command for arbitrarily setting a kind and weight of the dyeing material discharged from the cartridge 5.

FIG. 18 is an illustrative view showing a method of manually setting a hair dye according to an embodiment of the present invention.

When the controller 110 receives a command for selecting the manual setting icon 622, it may display a manual setting screen as shown in FIG. 18. The manual setting screen may include a sequence item 631 showing an operation order, a cartridge item 632 for selecting a kind of dyeing material, and a discharge amount item 633 for setting a discharge amount of a dyeing material.

The controller 110 may receive a command for inputting the kind of the dyeing material and the discharge amount to each of the cartridge item 632 and the discharge amount item 633 via an input interface 101. The user may input the kind and amount of the dyeing material to be included in the hair dye in the cartridge item 632 and the discharge amount item 633, respectively. The kind of dyeing material may be set by inputting a number of the cartridge containing the dyeing material into the cartridge item 632. The discharge amount item 633 may be set to units of 0.5 g, and a minimum discharge amount may be 0.5 g, but it is merely illustrative and the present invention is not limited thereto.

When the manual setting is completed, the controller 110 may locate a cartridge input corresponding to '1' of the sequence item 631 in a discharging area and then discharge the dyeing material by the set weight, and locate a cartridge input corresponding to '2' of the sequence item 631 in the discharging area and then discharge the dyeing material by the set weight, and . . . locate a cartridge input corresponding to '5' of the sequence item 631 in the discharging area and then discharge the dyeing material by the set weight to manufacture the hair dye.

Meanwhile, although FIG. 18 describes as an example in which the hair dye is manually manufactured by discharging the dyeing material from five cartridges, it is not limited to the number of cartridges. The display 6 may further include a cartridge add/delete icon (not shown), and when the 'cartridge add icon' is selected, the display 6 may add the sequence item 631, the cartridge item 632 and the discharge amount item 633, and when the 'cartridge delete icon' is selected, the sequence item 631, the cartridge item 632, and the discharge amount item 633 may be deleted.

FIG. 16 will be described again.

The remaining amount check/replace icon 623 may be an icon for displaying a remaining amount of the cartridge 5 and for replacing a specific cartridge 5.

FIG. 19 is an illustrative view showing a cartridge remaining amount check screen according to an embodiment of the present invention.

When the controller 110 receives a command for selecting the remaining amount check/replace icon 623, it may display the cartridge remaining amount check screen as shown in FIG. 19. The cartridge remaining amount check screen may include at least one of a cartridge number 641, first remaining amount information 642, and second remaining amount information 643. The first remaining amount information 642 and the second remaining amount information 643 may correspond to the cartridge numbers 641, respectively. The first remaining amount information 642 may display a remaining amount of the cartridge in a numerical value, and the unit may be g, but the present invention is not limited thereto. The second remaining amount information 643 may display the remaining amount of the cartridge in a graph, and the unit may be %, but the present invention is not limited thereto. In FIG. 19, the cartridge number 641 is disclosed from 1 to 10, but it is merely illustrative, and the entire cartridges mounted on the dispenser 1 may be displayed. For example, the cartridge number 641 may be from 1 to 20.

When a user wants to check the remaining amount of the cartridge, the remaining amount check/replace icon 623 may be selected.

Meanwhile, regardless of whether the user selects the remaining amount check/replace icon 623, the controller 110 may automatically output a remaining amount check/replace notification of the cartridge.

FIG. 20 is an illustrative view showing a screen in which a dispenser according to an embodiment of the present invention outputs a remaining amount check/replace notification of a cartridge.

The controller 110 may display a cartridge replacement alarm 650 when a remaining amount of a dyeing material contained in at least one cartridge 5 is less than a predetermined reference. After the initialization icon 621 is selected, the controller 110 may update the remaining amount of the cartridge by subtracting a weight of the dyeing material discharged from each cartridge each time the hair dye is manufactured. The controller 110 may update the remaining amount of the cartridge even though any one cartridge 5 is replaced. As a result of updating the remaining amount of the cartridge, the controller 110 may display the cartridge replacement alarm 650 when the remaining amount of at least one cartridge is less than the predetermined reference.

FIG. 21 is an illustrative view showing a cartridge remaining amount check screen after a cartridge replacement alarm according to an embodiment of the present invention is output.

The controller 110 may display a cartridge remaining amount check screen as shown in FIG. 19 or 21 when the remaining amount check/replace icon 623 is selected after the cartridge replacement alarm 650 is output.

In case of FIG. 21, unlike FIG. 19, the controller 110 may further display an indicator 661 showing a cartridge of which remaining amount is less than a predetermined reference. When the indicator 661 is further displayed, there is an advantage that it is possible to guide a user to easily recognize the cartridge which lacks a dyeing material.

The controller 110 may receive a command for selecting at least one cartridge number in the cartridge remaining amount check screen as shown in FIG. 19 or FIG. 21. The controller 110 may regard the command for selecting the cartridge number on the cartridge remaining amount check screen as receiving a cartridge replacement command. The controller 110 may display a cartridge replacement screen when receiving the command for selecting the cartridge number on the cartridge remaining amount check screen.

FIG. 22 is an illustrative view showing a cartridge replacement screen according to an embodiment of the present invention.

The controller 110 may display a cartridge replacement menu 665 when receiving a command for selecting any one of the cartridge numbers 641 displayed on the cartridge remaining amount screen. In FIG. 22, it is exemplified that 'No. 5' among the cartridge numbers 641 is selected, but it is merely an example for the convenience of description, and the present invention is not limited thereto.

The cartridge replacement menu 665 may include at least one of a cartridge number item 662, a cartridge movement item 663, and a cancel item 664. The cartridge number item 662 may show information of a selected cartridge. That is, the cartridge number item 662 may show information of a cartridge to be replaced. A user may be notified through the cartridge number item 662 that the cartridge has been properly selected for replacement. The cartridge movement item 663 may be an item for moving the selected cartridge to be located in a replacing area. When the controller 110 receives a command for selecting the cartridge movement item 663, it may control a main motor 30 such that the cartridge displayed in the cartridge number item 662 is located in the replacing area. Here, the replacing area may refer to an area in which the cartridge 5 having the shortest distance from a replacement door D among a plurality of cartridges 5 is located. It will be described later in detail with reference to FIG. 23. The cancel item 664 may be a command for canceling the cartridge replacement and removing the cartridge replacement menu 665.

FIG. 23 is an illustrative view showing a location change of a cartridge when receiving a cartridge replacement command according to an embodiment of the present invention. Specifically, (a) of FIG. 23 shows a location of the cartridge before receiving the replacement command of the cartridge, and (b) of FIG. 23 is a view showing a location of the changed cartridge after receiving the replacement command of the cartridge. (a) and (b) of FIG. 23 may be a plan view showing a housing, a mounting body, a power transmission shaft, a plurality of cartridges, and an accommodating body of a dispenser.

A plurality of cartridges 5 may rotate according to driving of a main motor 30, and a location of each of the plurality of cartridges 5 may be changed by rotation. A discharging area and a replacing area may be fixed locations.

Specifically, the discharging area may be an area having the shortest separation distance from an accommodating body 40 among areas in which each of the plurality of cartridges 5 may be located by rotation of a main body 21, and a location of a first cartridge may be shown in an example of (a) of FIG. 23 and a location of a third cartridge may be shown in an example of (b) of FIG. 23. In addition, the discharging area may refer to a location parallel to the accommodating body 40 in the vertical direction.

The replacing area may be an area having the shortest separation distance from a replacement door D among the areas in which each of the plurality of cartridges 5 may be located by rotation of the main body 21, and a location of the third cartridge may be shown in the example of (a) of FIG. 23 and a location of a fifth cartridge may be shown in the example of (b) of FIG. 23.

As shown in (a) of FIG. 23, when the cartridge replacement command corresponding to the fifth cartridge is received in a state in which the plurality of cartridges 5 are located, the controller 110 may rotate the plurality of cartridges 5 such that the fifth cartridge is located in the replacing area by driving the main motor 30. Accordingly, a user may replace the cartridge nearest to the replacement door D by opening the replacement door D when replacing the cartridge, and thus there is an advantage that the cartridge may be easily replaced.

The controller 110 may update a remaining amount of the replaced cartridge when a specific cartridge is replaced.

FIG. 16 will be described again.

The weight check icon 624 may be an icon representing a weight sensed through the weight sensor 104. The weight sensor 104 may be formed in the accommodating body 40. The weight sensor 104 may show only a weight of the basket 7 before the dyeing material is discharged, or a combined weight of the basket 7 and the dyeing material contained in the basket 7.

FIG. 24 is an illustrative view showing a method of displaying a weight of a dyeing material discharged from a dispenser according to an embodiment of the present invention. (a) OF FIG. 24 is a screen showing a weight of a basket 7 before discharging the dyeing material, and (b) OF FIG. 24 is a screen showing the weight of the basket 7 after discharging the dyeing material.

The controller 110 may display weight information 670, a measurement icon 671, and a stop icon 672 when receiving a command for selecting a weight check icon 624. The weight information 670 may show a weight measured via a weight sensor 104. When receiving a command for selecting the measurement icon 671, the controller 110 may display the weight measured via the weight sensor 104 in the weight information 670. The controller 110 may stop the weight measurement when receiving a command for selecting the stop icon 672.

The controller 110 may calculate a total weight of a hair dye through an operation of subtracting a second weight which is a weight of only the basket 7 measured via the weight sensor 104 before manufacturing the hair dye from a first weight measured via the weight sensor 104.

According to the embodiment, the dispenser 1 may store the weight of the basket 7 at a fixed weight. In this case, the controller 110 may calculate the total weight of the hair dye through the operation of subtracting the stored weight of the basket 7 from a weight measured by measuring only a weight when the hair dye manufacture is completed.

Meanwhile, although the dispenser 1 has been illustratively described for manufacturing the hair dye, the dispenser 1 may manufacture cosmetics and the like. For example, each of the plurality of cartridges 5 provided in the dispenser 1 includes cosmetic ingredients such as a toner, an essence, and a lotion, so that the dispenser 1 may manufacture and provide customized cosmetic products. Thus, it is reasonable that products manufactured by dispenser 1 may be varied in hair dyes, cosmetics, and the like, and the present invention is not limited to the kind of products.

The above description is merely illustrative of the technical idea of the present invention, and various modifications and changes may be made thereto by those skilled in the art without departing from the essential characteristics of the present invention.

Therefore, the embodiments of the present invention are not intended to limit the technical spirit of the present invention but to illustrate the technical idea of the present invention, and the technical spirit of the present invention is not limited by these embodiments.

The scope of protection of the present invention should be interpreted by the appending claims, and all technical ideas within the scope of equivalents should be construed as falling within the scope of the present invention.

The invention claimed is:

1. A hair dye providing system comprising:

a dispenser for discharging dyeing materials accommodated in a plurality of cartridges to provide a hair dye, wherein the dispenser includes:

a main motor for driving any one of the plurality of cartridges to be located in a discharging area;

a discharge module for driving the dyeing material to be discharged from a cartridge located in the discharging area;

a weight sensor for sensing a weight of the dyeing material discharged from the discharging area; and a controller calculating a hair dye manufacturing method and controlling the main motor and the discharge module according to the hair dye manufacturing method, wherein the controller moves up an elevating body for pressing the cartridge located in the discharging area by a set height for each setting period until a weight change amount sensed by the weight sensor reaches a reference value, wherein the elevating body moves between an initial height and the set height higher than the initial height, wherein the elevating body moves to a first height among the set height, presses the cartridge to discharge the dyeing material accommodated in the cartridge, and maintains the first height of the elevating body until a first discharge amount is obtained, and wherein, when the first discharge amount is obtained, the elevating body moves to a second height different from the first height among the set height, presses the cartridge to discharge the dyeing material accommodated in the cartridge, and maintains the second height of the elevating body until a second discharge amount smaller than the first discharge amount is obtained.

2. The hair dye providing system of claim 1, wherein the controller senses a weight change sensed by the weight sensor for each moving up time of the elevating body and moves up the elevating body by the set height for each setting period until the weight change is sensed.

3. The hair dye providing system of claim 2, wherein when the weight change is sensed and the weight change amount is less than the reference value, the controller moves up once the elevating body by the set height and then maintains a rise height for a set time.

4. The hair dye providing system of claim 2, wherein when the weight change is sensed and the weight change amount is equal to or greater than the reference value, the controller compares a target discharge weight to be discharged from the cartridge located in the discharging area with a reference weight to determine whether or not an acceleration discharge operation is performed.

5. The hair dye providing system of claim 4, wherein when the target discharge weight is equal to or greater than the reference weight, the controller performs the acceleration discharge operation that maintains a height of the elevating body until a sensed weight of the weight sensor reaches a first set weight.

6. The hair dye providing system of claim 4, wherein when the target discharge weight is less than the reference weight, the controller moves down the elevating body to an initial height after the sensed weight of the weight sensor reaches a second set weight.

7. The hair dye providing system of claim 1, wherein the controller controls the main motor and the discharge module to discharge the dyeing material, and then determines whether the sensed weight of the weight sensor is within an error range of the target discharge weight, and when the sensed weight of the weight sensor is within the error range of the target discharge weight, the controller terminates discharging the dyeing material from the cartridge located in the discharging area.

8. The hair dye providing system of claim 7, wherein when the sensed weight of the weight sensor is out of the error range of the target discharge weight, the controller corrects the discharge weight of another dyeing material when the sensed weight of the weight sensor exceeds the target discharge weight.

9. The hair dye providing system of claim 7, wherein when the sensed weight of the weight sensor is out of the error range of the target discharge weight, the controller controls in a delicacy discharge mode when the sensed weight of the weight sensor is equal to or less than the target discharge weight.

10. The hair dye providing system of claim 1, wherein the discharge module includes the elevating body and the elevating motor for elevating the elevating body.

11. The hair dye providing system of claim 1, further comprising a display for displaying information on the hair dye or the hair dye manufacturing method.

12. The hair dye providing system of claim 11, wherein the display further displays a plurality of sample colors, and further includes an input interface for receiving a command to select any one of the plurality of sample colors as a target color.

13. A hair dye providing system comprising:

a dispenser for discharging dyeing materials accommodated in a plurality of cartridges to provide a hair dye, wherein the dispenser includes:

a main motor for driving any one of the plurality of cartridges to be located in a discharging area;

an elevating body for pressing the dyeing material to be discharged from a cartridge located in the discharge area;

an elevating motor for elevating or lowering the elevating body;

a weight sensor for sensing a weight of the dyeing material discharged from the discharging area; and a controller calculating a hair dye manufacturing method and controlling the main motor and the discharge module according to the hair dye manufacturing method, wherein the controller moves up the elevating body to a height at which the dyeing material is continuously discharged and moves down the elevating body by a set height to reduce a discharge amount when a weight of the discharged dyeing material reaches a first set weight, wherein the elevating body moves between an initial height and the set height higher than the initial height, the elevating body moves to a first height among the set height, presses the cartridge to discharge the dyeing material accommodated in the cartridge, and maintains the first height of the elevating body until a first discharge amount is obtained, and when the first discharge amount is obtained, the elevating body moves to a second height different from the first height among the set height, presses the cartridge to discharge the dyeing material accommodated in the cartridge, and maintains the second height of the elevating body until a second discharge amount smaller than the first discharge amount is obtained.

14. The hair dye providing system of claim 13, wherein the controller moves down the elevating body by the set height until the weight of the discharged dyeing material reaches a second set weight greater than the first set weight.

15. The hair dye providing system of claim 13, wherein the controller moves down the elevating body to a height spaced apart from the cartridge when the weight of the discharged dyeing material reaches the second set weight greater than the first set weight, and performs a delicacy discharge mode in which the elevating body moves up and down so as to be separated after contacting the cartridge within a predetermined time until the weight of the discharged dyeing material reaches a target discharge weight.

16. The hair dye providing system of claim 13, wherein the first set weight is a weight obtained by subtracting a set value from the target discharge weight.

17. The hair dye providing system of claim 13, wherein the controller calculates a weight corresponding to a predetermined ratio of the target discharge weight as the first set weight.

18. The hair dye providing system of claim 13, wherein the controller maintains a height of the elevating body until the weight of the discharged dyeing material reaches the first set weight.

19. The hair dye providing system of claim 13, further comprising a display for displaying information on the hair dye or the hair dye manufacturing method.

20. The hair dye providing system of claim 13, wherein the display further displays a plurality of sample colors, and further includes an input interface for receiving a command to select any one of the plurality of sample colors as a target color.

* * * * *